(12) United States Patent
Tabata

(10) Patent No.: US 11,749,239 B2
(45) Date of Patent: Sep. 5, 2023

(54) ELECTRONIC WIND INSTRUMENT, ELECTRONIC WIND INSTRUMENT CONTROLLING METHOD AND STORAGE MEDIUM WHICH STORES PROGRAM THEREIN

(71) Applicant: CASIO COMPUTER CO., LTD., Tokyo (JP)

(72) Inventor: Yuji Tabata, Ome (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 469 days.

(21) Appl. No.: 17/004,226

(22) Filed: Aug. 27, 2020

(65) Prior Publication Data
US 2021/0090534 A1    Mar. 25, 2021

(30) Foreign Application Priority Data
Sep. 20, 2019 (JP) .................. 2019-172081

(51) Int. Cl.
| | | |
|---|---|---|
| G10H 1/00 | (2006.01) | |
| G10H 1/46 | (2006.01) | |
| G10H 1/34 | (2006.01) | |
| G06F 3/16 | (2006.01) | |
| H04R 1/02 | (2006.01) | |

(52) U.S. Cl.
CPC ........... *G10H 1/0008* (2013.01); *G06F 3/165* (2013.01); *G10H 1/34* (2013.01); *G10H 1/46* (2013.01); *H04R 1/028* (2013.01); *G10H 2220/361* (2013.01)

(58) Field of Classification Search
CPC .......... G10H 1/0008; G10H 1/34; G10H 1/46; G10H 2220/361; G06F 3/165; H04R 1/028
USPC .......................................... 84/644
See application file for complete search history.

(56) References Cited

U.S. PATENT DOCUMENTS

| | | | | |
|---|---|---|---|---|
| 2,301,184 A | * | 11/1942 | Arnold ...................... | G10H 1/32 |
| | | | | 84/742 |
| 2,355,287 A | * | 8/1944 | Firestone ................ | G10L 25/00 |
| | | | | 330/141 |
| 3,439,106 A | * | 4/1969 | Goodale .................. | G10H 1/46 |
| | | | | 984/354 |
| 3,558,795 A | * | 1/1971 | Barcus ..................... | G10H 3/16 |
| | | | | 84/730 |

(Continued)

FOREIGN PATENT DOCUMENTS

JP        2019012131 A    1/2019

*Primary Examiner* — Christina M Schreiber
(74) *Attorney, Agent, or Firm* — Holtz, Holtz & Volek PC

(57) ABSTRACT

An electronic wind instrument includes a tonguing sensor which detects tonguing, a breath sensor which detects a breath value, a loudspeaker which outputs a musical sound and a processor which controls the musical sound, in which the processor acquires a tonguing value which depends on a tonguing time which is the time which has elapsed after start of the tonguing which is detected by the tongue sensor, decides a silencing effect value which indicates a degree of volume reduction depending on the tonguing value, acquires the breath value which depends on a magnitude of a breath sensor signal which indicates a result of detection by the breath sensor and makes the loudspeaker emit the musical sound whose volume which depends on the breath value is reduced depending on the silencing effect value.

11 Claims, 15 Drawing Sheets

(56) References Cited

U.S. PATENT DOCUMENTS

| | | | | |
|---|---|---|---|---|
| 5,459,280 | A * | 10/1995 | Masuda | G10H 5/007 84/622 |
| 6,002,080 | A * | 12/1999 | Tanaka | G10H 1/34 84/649 |
| 9,159,321 | B2 * | 10/2015 | Cheung | G06V 40/20 |
| 9,386,147 | B2 * | 7/2016 | McDysan | H04M 3/568 |
| 10,170,091 | B1 * | 1/2019 | Tabata | G10H 1/0551 |
| 10,468,005 | B2 * | 11/2019 | Toyama | G10H 1/46 |
| 10,475,431 | B2 * | 11/2019 | Smith | G10H 3/125 |
| 10,497,343 | B2 * | 12/2019 | Hashimoto | G10H 3/16 |
| 10,832,645 | B2 * | 11/2020 | Davey | G10H 3/125 |
| 11,200,872 | B2 * | 12/2021 | Davey | G10D 7/026 |
| 2003/0066414 | A1 * | 4/2003 | Jameson | G10H 5/005 84/735 |
| 2005/0217464 | A1 * | 10/2005 | Onozawa | G10H 1/34 84/723 |
| 2007/0017352 | A1 * | 1/2007 | Masuda | G10H 5/007 84/658 |
| 2009/0020000 | A1 * | 1/2009 | Onozawa | G10H 1/32 84/723 |
| 2014/0190332 | A1 * | 7/2014 | Winquist | G10D 9/06 84/384 |
| 2015/0348525 | A1 * | 12/2015 | Nakae | G10H 1/053 84/735 |
| 2016/0275929 | A1 * | 9/2016 | Harada | G10H 1/46 |
| 2016/0275930 | A1 * | 9/2016 | Harada | G10H 1/32 |
| 2018/0075831 | A1 * | 3/2018 | Toyama | G10H 3/16 |
| 2018/0082664 | A1 * | 3/2018 | Sasaki | H03H 7/01 |
| 2018/0268791 | A1 * | 9/2018 | Okuda | G10H 1/0551 |
| 2019/0005931 | A1 * | 1/2019 | Kasuga | G10H 1/0008 |
| 2019/0005932 | A1 * | 1/2019 | Tabata | G10H 1/057 |
| 2020/0372888 | A1 * | 11/2020 | Sasaki | G10H 3/143 |
| 2021/0090534 | A1 * | 3/2021 | Tabata | G06F 3/165 |

* cited by examiner

ELECTRONIC WIND INSTRUMENT, ELECTRONIC WIND INSTRUMENT CONTROLLING METHOD AND STORAGE MEDIUM WHICH STORES PROGRAM THEREIN

BACKGROUND OF THE INVENTION

Field of the Invention

The present invention relates to an electronic wind instrument, an electronic wind instrument controlling method and a storage medium which stores a program therein.

Description of the Related Art

An electronic wind instrument which is equipped with a mouthpiece and a reed similarly to a woodwind instrument (in the following, referred to as a "natural woodwind instrument") which is not an electronic instrument and emits a musical sound depending on a playing operation which is performed by a player using the mouthpiece and the reed is known. For example, Japanese Patent Application Laid Open No. 2019-12131 discloses an electronic wind instrument which is equipped with the mouthpiece and the reed, decides intensity of the musical sound depending on an output value of a breath sensor which measures a pressure of the player's breath which is breathed into the mouthpiece and controls sound-muting of the musical sound depending on an output value of a tongue sensor which detects whether the player's tongue is brought into contact with the reed.

SUMMARY OF THE INVENTION

According to one aspect of the present invention, there is provided an electronic wind instrument including a tongue sensor which detects tonguing, a breath sensor which detects a breath value, a loudspeaker which outputs a musical sound and at least one processor which controls the musical sound, in which the processor acquires a tonguing value which depends on a tonguing time which is the time which has elapsed after start of the tonguing which is detected by the tongue sensor, decides a silencing effect value which indicates a degree of volume reduction depending on the tonguing value, acquires the breath value which depends on a magnitude of a breath sensor signal which indicates a result of detection by the breath sensor, and makes the loudspeaker emit the musical sound whose volume which depends on the breath value is reduced depending on the silencing effect value.

DETAILED DESCRIPTION OF THE PREFERRED EMBODIMENTS

First Embodiment

Figure 1:
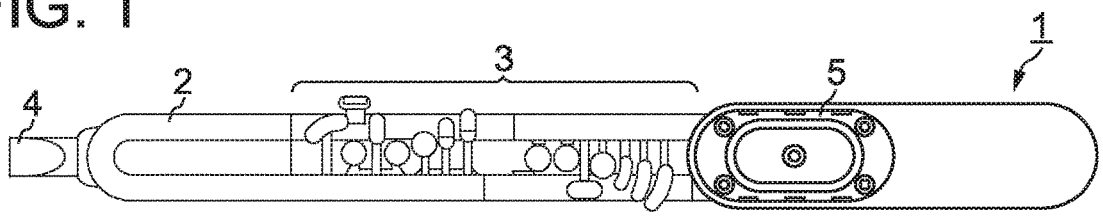
FIG. 1 is a front view illustrating one example of an electronic wind instrument according to a first embodiment of the present invention.

In the following, an electronic wind instrument according to a first embodiment of the present invention will be described with reference to the drawings. In the drawings, the mutually same numerals are assigned to the mutually same or equivalent configurations.

An electronic wind instrument 1 which is illustrated in FIG. 1 has a shape which resembles the shape of a saxophone which is a natural woodwind instrument and emits a musical sound which resembles the musical sound of the saxophone depending on a music playing operation by a player.

Figure 2:
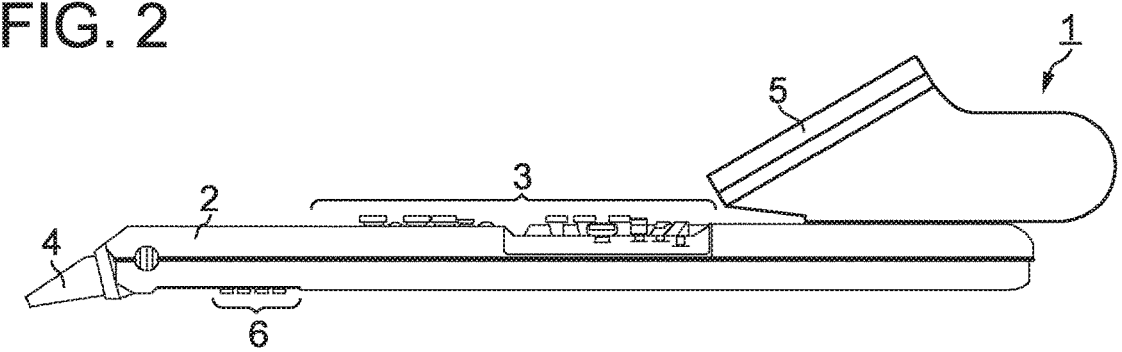
FIG. 2 is a side view illustrating one example of the electronic wind instrument according to the first embodiment of the present invention.

The electronic wind instrument 1 includes a tube body 2 which has a shape which resembles the shape of the saxophone, a plurality of playing keys 3, a mouthpiece 4 that the player holds in his/her mouth when playing music and a sound emission unit 5 which emits the musical sound as illustrated in FIG. 1. In addition, the electronic wind instrument 1 includes a plurality of operation switches 6 which accepts an operation other than the music playing operation by the player as illustrated in FIG. 2. A power switch which accepts an operation of switching on/off a power source of the electronic wind instrument 1 is included in the operation switches 6.

Each playing key 3 accepts a music playing operation that the plyer presses the key with his/her finger. Although details will be described later, the electronic wind instrument 1 emits the musical sound which has a pitch which depends on the music playing operation that each playing key 3 accepts from the sound emission unit 5. That is, each playing key 3 is a music playing operator which accepts a music playing operation for designating the pitch of the musical sound.

The mouthpiece 4 accepts a music playing operation that the plyer breathes into the mouthpiece 4, a music playing operation that the player brings his/her tongue into contact with a reed 41 which will be described later, a music playing operation that the player brings his/her lips into contact with the mouthpiece 4 and a music playing operation that the player utters his/her voice when the player breathes into the mouthpiece 4. Although details will be described later, the electronic wind instrument 1 emits the musical sound which has a volume and a tone which depend on the music playing operation that the mouthpiece 4 accepts from the sound emission unit 5. That is, the mouthpiece 4 is a music playing operator which accepts a music playing operation for designating the volume and the tone of the musical sound.

Figure 3:
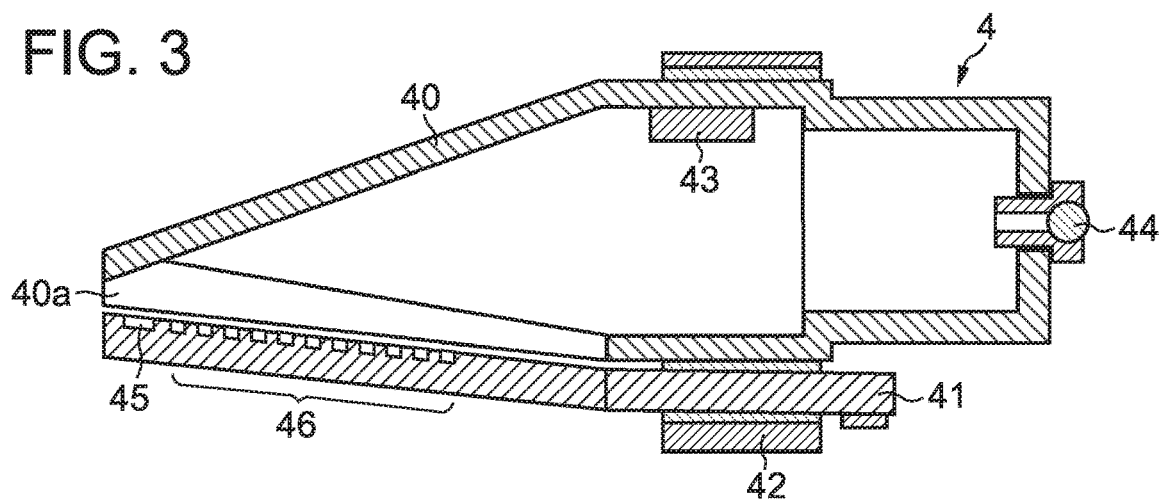
FIG. 3 is a sectional diagram illustrating one example of a mouthpiece that the electronic wind instrument according to the first embodiment of the present invention includes.

The mouthpiece 4 includes a mouthpiece body 40, the reed 41, a metal fitting 42, a voice sensor 43, a breath sensor 44, a tongue sensor 45 and a plurality of lip sensors 46 as illustrated in FIG. 3.

A cavity is formed in the mouthpiece body 40 and an opening 40*a* which communicates with the cavity is formed in the mouthpiece body 40. In a case where the plyer breathes into the mouthpiece 4 in a state of holding the mouthpiece 4 in the mouth, the breath is guided into the cavity in the mouthpiece body 40 through the opening 40*a*.

As a method of playing a natural woodwind instrument, a technique which is called growl (growling) that the tone of the musical sound is changed by uttering the voice while the music playing operation of breathing into the mouthpiece 4 is being performed is known. In a case where the player utters the voice in a state of holding the mouthpiece 4 in the mouth when the growling is done by using the electronic wind instrument 1, the voice is guided into the cavity in the mouthpiece body 40 through the opening 40*a*.

One end of the reed 41 is fixed to the mouthpiece body 40 by the metal fitting 42. On the other hand, the other end of the reed 41 is not fixed to the mouthpiece body 40 and vibrates depending on the music playing operation of breathing into the mouthpiece 4 by the player. In the following, the end of the reed 41 which is fixed to the mouthpiece body 40 will be called a heel-side end 41*b* and the end of the reed 41 which is not fixed to the mouthpiece body 40 will be called a tip-side end 41*a*.

The voice sensor 43 is disposed in the cavity in the mouthpiece body 40, detects the music playing operation that the player utters the voice and supplies a voice sensor signal which indicates a result of detection to a CPU (Central Processing Unit) 7 which will be described later. Specifically, the voice sensor 43 is a microphone and detects the voice of the player which is guided into the cavity in the mouthpiece body 40 through the opening 40*a* when the player utters the voice in a state of holding the mouthpiece 4 in the mouth. In a case where the player does the growling by using the electronic wind instrument 1, the voice sensor 43 detects the player's voice which is guided into the cavity in the mouthpiece body 40. Although details will be described later, the electronic wind instrument 1 reproduces a musical performance expression which is given in a case where the growling is being done by using a saxophone by emitting a musical sound of a tone which depends on the result of detection by the voice sensor 43.

The breath sensor 44 detects the music playing operation that the player breathes into the mouthpiece 4 and supplies a breath sensor signal which indicates a result of detection to the CPU 7 which will be described later. Specifically, the breath sensor 44 is a pressure sensor and detects a pressure of the player's breath which is guided into the cavity in the mouthpiece body 40 through the opening 40*a* when the player breathes into the mouthpiece 4 in a state of holding the mouthpiece 4 in the mouth. Although details will be described later, the electronic wind instrument 1 emits the musical sound in the volume which depends on the result of detection by the breath sensor 44.

The tongue sensor 45 detects the music playing operation that the plyer brings the tongue into contact with the reed 41 and supplies a tongue sensor signal which indicates a result of detection to the CPU 7 which will be described later. Specifically, the tongue sensor 45 is a capacitance system touch sensor and detects contact of the player's tongue with the reed 41. In a case where the player does tonguing (usual tonguing or legato tonguing) that the plyer brings the tongue into contact with the reed 41 by using the electronic wind instrument 1, the tongue sensor 45 detects contact of the player's tongue with the reed 41. Although details will be described later, the electronic wind instrument 1 reproduces a musical performance expression which is given in a case where the tonguing concerned is being done by using the saxophone by emitting the musical sound in a volume which depends on a result of detection by the tongue sensor 45.

The lip sensor 46 detects the music playing operation that the player brings the lips into contact with the mouthpiece 4 and supplies a lip sensor signal which indicates a result of detection to the CPU 7 which will be described later. Specifically, the lip sensor 46 is a capacitance system touch sensor and detects contact of the player's lips with the mouthpiece 4.

Figure 4:
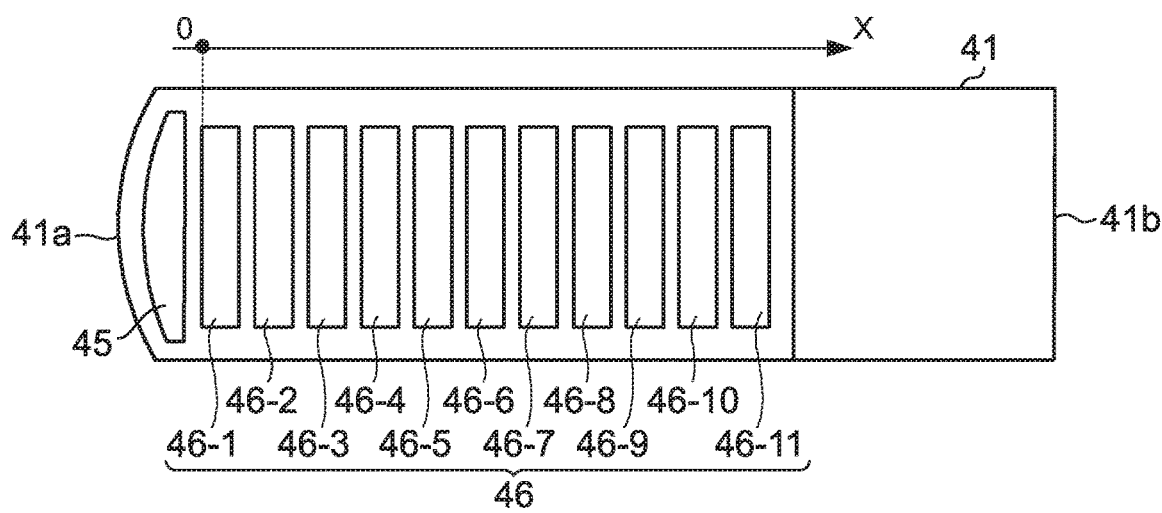
FIG. 4 is a front view illustrating one example of a reed that the electronic wind instrument according to the first embodiment of the present invention includes.

The tongue sensor 45 and the lip sensor 46 are disposed on the reed 41 as illustrated in FIG. 4. The mouthpiece 4 includes eleven lip sensors 46. Numbers "1" to "11" are assigned in advance to the respective lip sensors 46 as identifiers and the numbers which are assigned to the respective lip sensors 46 are indicated in FIG. 4. For example, the lip sensor 46-5 is the lip sensor 46 to which the number "5" is assigned as the identifier. In the following, for facilitation of understanding, an X-coordinate axis is set as illustrated in FIG. 4. In addition, in the following, a positive orientation in an X-axis direction will be referred to as the back and a negative orientation in the X-axis direction will be referred to as the front. The tip-side end 41*a* of the reed 41 is the front-side end of the reed 41 and the heel-side end 41*b* of the reed 41 is the back-side end of the reed 41.

The tongue sensor 45 is disposed on the tip-side end 41*a* of the reed 41. All the lip sensors 46-1 to 46-11 are disposed at positions which are separated from the tongue sensor 45 backward. In the following, the origin of the X-coordinate axis will be set such that the X coordinate of a front-side end of the lip sensor 46-1 which is the closest to the tongue sensor 45 becomes "zero".

Although details will be described later, the electronic wind instrument 1 reproduces a musical performance expression which is given in a case of performing subtonic playing (to play subtones on the saxophone) or percussive tonic playing (to play percussive tones on the saxophone) by using the saxophone by acquiring a lip position which is a position where the plyer's lips are in contact with the reed 41 on the mouthpiece 4 depending on the result of detection by the lip sensor 46 and emitting the musical sound which depends on the acquired lip position. The subtonic playing is a music playing method of emitting a musical sound of a tone which is softer than a tone of a musical sound obtained when performing usual music playing by breathing into the mouthpiece in a state where the player holds the mouthpiece that the saxophone includes more shallowly than mouthpiece holding which is attained in a case where the usual music playing is performed, that is, a state where the lip position is located more forward than a lip position which is obtained when performing the usual music playing. The percussive tonic playing is a music playing method of emitting a musical sound of a tone which is more crisp than the tone obtained when performing the usual music playing by breathing into the mouthpiece in a state where the player holds the mouthpiece that the saxophone includes more deeply than mouthpiece holding which is attained in a case where the usual music playing is performed, that is, a state where the lip position is located more backward than the lip position which is obtained when performing the usual music playing.

The lip position is indicated by the X coordinate. The more the lip position is located forward, the smaller the X-coordinate which indicates the lip position becomes and the more the lip position is located backward, the larger the X-coordinate which indicates the lip position becomes. For example, the X-coordinate which indicates the lip position when performing the subtonic playing by using the electronic wind instrument 1 is smaller than the X-coordinate which indicates the lip position when performing the usual music playing by using the electronic wind instrument 1. In addition, the X-coordinate which indicates the lip position when performing the percussive tonic playing by using the electronic wind instrument 1 is larger than the X-coordinate which indicates the lip position when performing the usual music playing by using the electronic wind instrument 1.

Figure 5:
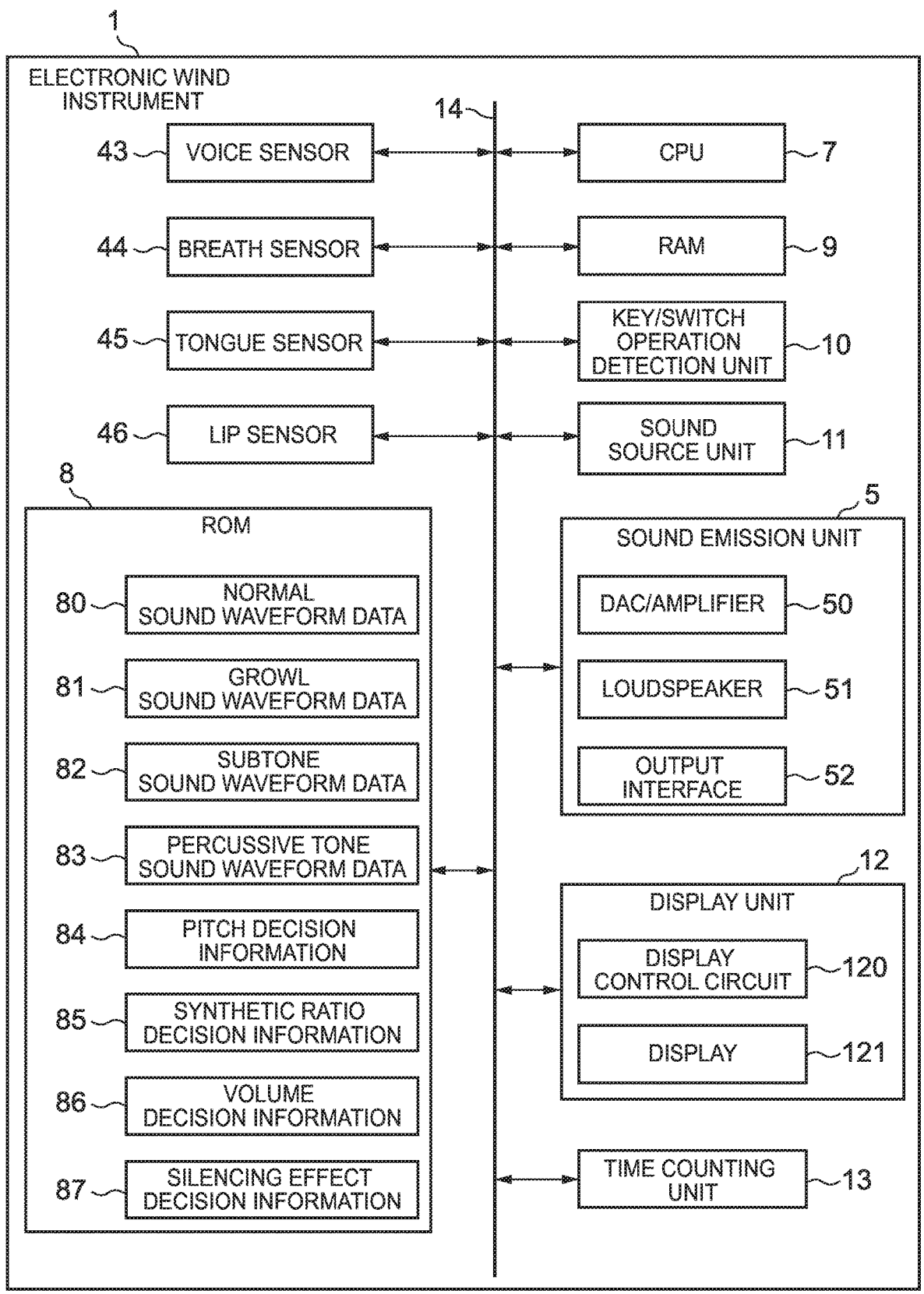
FIG. 5 is a diagram illustrating one example of an electric configuration of the electronic wind instrument according to the first embodiment of the present invention.

As illustrated in FIG. 5, the electronic wind instrument 1 includes the CPU 7, a ROM (Read Only Memory) 8, a RAM (Random Access Memory) 9, a key/switch operation detection unit 10, a sound source unit 11, a DAC (Digital-to-Analog Converter)/amplifier 50, a loudspeaker 51, an output interface 52, a display unit 12, a time counting unit 13 and a system bus 14 which connects these respective units with one another, in addition to the above-mentioned respective configurations.

The CPU 7 executes various processes in accordance with a program and data which are stored in the ROM 8. The CPU 7 is connected to the respective units of the electronic wind instrument 1 via the system bus 14 which is a transmission path of commands and the data and all-inclusively controls the operation of the entire electronic wind instrument 1.

The ROM 8 non-temporarily stores therein the program and the data that the CPU 7 uses for execution of the various processes. Specifically, the ROM 8 stores a control program that the CPU 7 executes. In addition, the ROM 8 stores normal sound waveform data 80, growl sound waveform data 81, subtone sound waveform data 82, percussive tone sound waveform data 83, pitch decision information 84, synthetic ratio decision information 85, volume decision information 86 and silencing effect decision information 87.

The normal sound waveform data 80 is sound waveform data which indicates the musical sound of the saxophone obtained in a case where the usual music playing is performed. The growl sound waveform data 81 is sound waveform data which indicates the musical sound of the saxophone obtained in a case where the growling is being done. The subtone sound waveform data 82 is sound waveform data which indicates the musical sound of the saxophone obtained in a case where the subtonic playing is performed. The percussive tone sound waveform data 83 is sound waveform data which indicates the musical sound of the saxophone obtained in a case where the percussive tonic playing is performed. Although details will be described later, the sound source unit 11 generates a digital musical sound signal by mixing together the normal sound waveform data 80, the growl sound waveform data 81, the subtone sound waveform data 82 and the percussive tone sound waveform data 83 which are stored in the ROM 8 in accordance with control by the CPU 7.

The normal sound waveform data 80 is generated by an external recording device by recording the musical sound of the saxophone which is obtained in a case where the usual music playing is being performed, then is fetched into the electronic wind instrument 1 and is stored in advance in the ROM 8. The growl sound waveform data 81 is generated by the external recording device by recording the musical sound of the saxophone which is obtained in a case where the growling is being done, then is fetched into the electronic wind instrument 1 and is stored in advance in the ROM 8. The subtone sound waveform data 82 is generated by the external recording device by recording the musical sound of the saxophone which is obtained in a case where the subtonic playing is being performed, then is fetched into the electronic wind instrument 1 and is stored in advance in the ROM 8. The percussive tone sound waveform data 83 is generated by the external recording device by recording the musical sound of the saxophone which is obtained in a case where the percussive tonic playing is being performed, then is fetched into the electronic wind instrument 1 and is stored in advance in the ROM 8.

The pitch decision information 84, the synthetic ratio decision information 85, the volume decision information 86 and the silencing effect decision information 87 will be described later.

The RAM 9 temporarily stores data that the CPU 7 generates or acquires by executing the various processes. The RAM 9 functions as a work area of the CPU 7. That is, the CPU 7 executes the various processes by reading out the program and the data which are stored in the ROM 8 into the RAM 9 and referring to the read-out program and data.

The key/switch operation detection unit 10 detects the music playing operation that each playing key 3 accepts and an operation on the operation switch 6 and supplies a key/switch operation signal which indicates a result of detection to the CPU 7. In the following, the music playing operation that each operation key 3 accepts and the operation on the operation switch 6 will be referred to as a key/switch operation all together.

The sound source unit 11 includes a sound source LSI (Large Scale Integrated Circuit) such as a DSP (Digital Signal Processor), an ASIC (Application Specific Integrated Circuit), an FPGA (Field Programmable Array) and so forth and generates the digital musical sound signal which indicates the musical sound in accordance with control by the CPU 7. The sound source unit 11 supplies the generated digital musical sound signal to the sound emission unit 5.

The DAC/amplifier 50, the loudspeaker 51 and the output interface 52 are installed in the sound emission unit 5. The DAC/amplifier 50 generates an analog musical sound signal which indicates the musical sound by conducting D/A (Digital-to-Analog) conversion on the digital musical sound signal which is supplied from the sound source unit 11, then amplifies the generated analog musical sound signal and supplies the amplified analog musical sound signal to the loudspeaker 51 and the output interface 52. The loudspeaker 51 emits the musical sound that the analog musical sound signal which is supplied from the DAC/amplifier 50 indicates. The output interface 52 outputs the analog musical sound signal which is supplied from the DAC/amplifier 50 to external devices such as an external loudspeaker, an external headphone and so forth.

The display unit 12 displays various images which include operation screens of the electronic wind instrument 1 in accordance with the control by the CPU 7. The display unit 12 includes a display control circuit 120 and a display 121.

The display control circuit 120 controls the operation of the display 121 in accordance with the control by the CPU 7. The display 121 is a display such as a liquid crystal display, an organic EL (Electroluminescence) display and so forth and displays the various images in accordance with control by the display control circuit 120.

The time counting unit 13 includes an RTC (Real Time Clock) which keeps time-counting even while power supply is being stopped and conducts time-counting. The time counting unit 13 supplies a signal which indicates a result of time-counting to the CPU 7.

Figure 6:
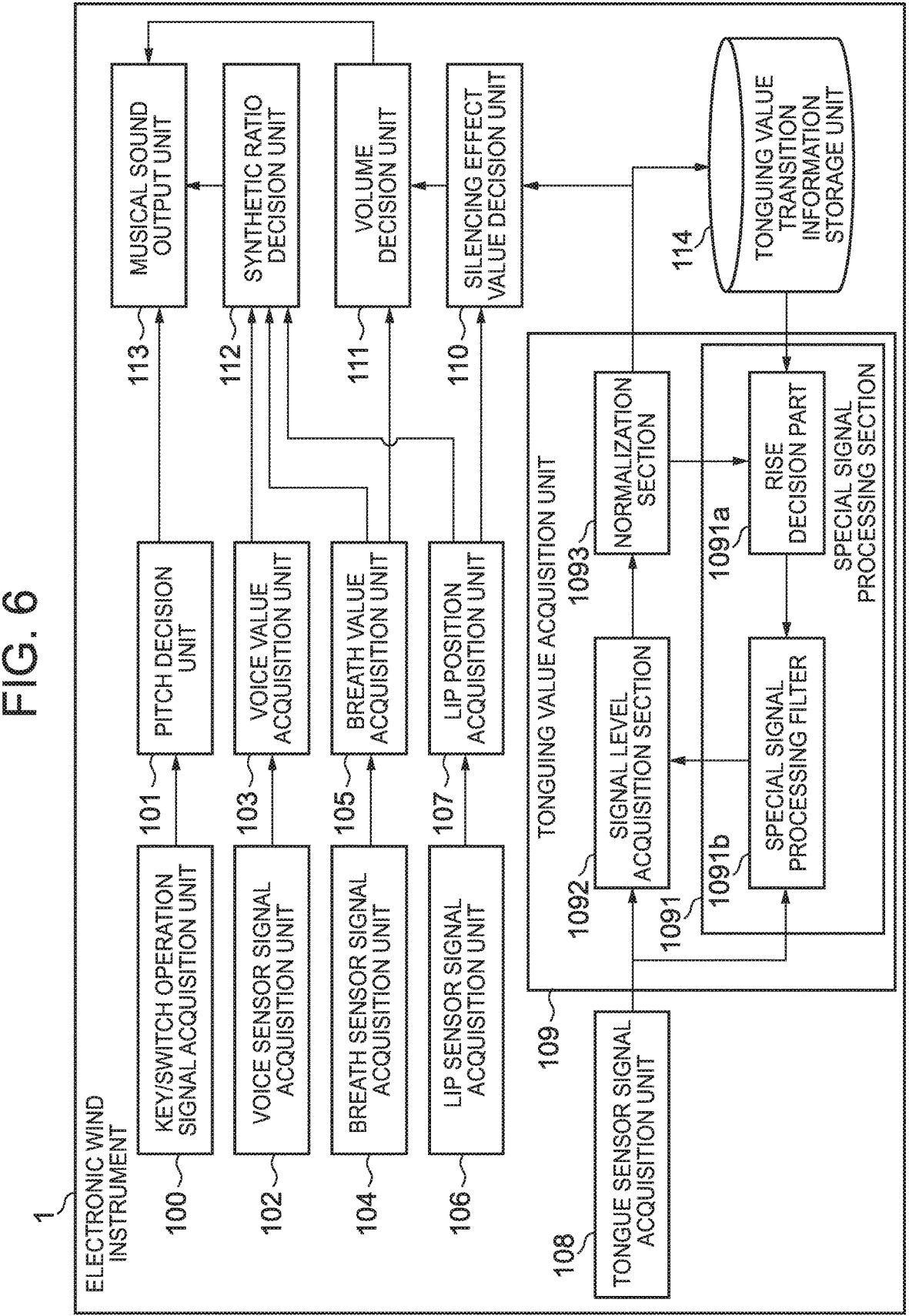
FIG. 6 is a diagram illustrating one example of a functional configuration of the electronic wind instrument according to the first embodiment of the present invention.

The electronic wind instrument 1 which includes the above-mentioned physical configurations functionally includes a key/switch operation signal acquisition unit 100, a pith decision unit 101, a voice sensor signal acquisition unit 102, a voice value acquisition unit 103, a breath sensor signal acquisition unit 104, a breath value acquisition unit 105, a lip sensor signal acquisition unit 106, a lip position acquisition unit 107, a tongue sensor signal acquisition unit 108, a tonguing value acquisition unit 109, a silencing effect value decision unit 110, a volume decision unit 111, a synthetic ratio decision unit 112, a musical sound output unit 113 and a tonguing value transition information storage unit 114 as illustrated in FIG. 6.

The key/switch operation signal acquisition unit 100, the pith decision unit 101, the voice sensor signal acquisition unit 102, the voice value acquisition unit 103, the breath sensor signal acquisition unit 104, the breath value acquisition unit 105, the lip sensor signal acquisition unit 106, the lip position acquisition unit 107, the tongue sensor signal acquisition unit 108, the tonguing value acquisition unit 109, the silencing effect value decision unit 110, the volume decision unit 111, the synthetic ratio decision unit 112 and the musical sound output unit 113 are realized by the CPU 7. Specifically, the CPU 7 controls the operation of the electronic wind instrument 1 by executing the control program which is stored in the ROM 8 and thereby functions as the units 100 to 113. The tonguing value transition information storage unit 114 is realized by the RAM 9. Specifically, the tonguing value transition information storage unit 114 is constructed in a storage area of the RAM 9.

The key/switch operation signal acquisition unit 100 acquires the key/switch operation signal from the key/switch operation detection unit 10 and supplies the acquired key/switch operation signal to the pitch decision unit 101. The pitch decision unit 101 decides the pitch of the musical sound depending on a result of detection of the key/switch operation by the key/switch operation detection unit 10 that the key/switch operation signal which is acquired by the key/switch operation signal acquisition unit 100 indicates and supplies pitch information which indicates the decided pitch to the musical sound output unit 113.

Specifically, the pitch decision unit 101 decides the pitch of the musical sound which depends on the result of detection of the key/switch operation by the key/switch operation detection unit 10 that the key/switch operation signal which is acquired by the key/switch operation signal acquisition unit 100 indicates in accordance with the pitch decision information 84 which is stored in the ROM 8 and which indicates a correspondence relation between the result of detection of the key/switch operation by the key/switch operation detection unit 10 and the pitch of the musical sound.

The pitch decision information 84 is generated by an external information processing device by setting the correspondence relation between the result of detection of the key/switch operation by the key/switch operation detection unit 10 and the pitch of the musical sound in accordance with a correspondence relation between the operation key and the pitch of the musical sound of the saxophone and then is fetched into the electronic wind instrument 1 and is stored in advance in the ROM 8. Incidentally, a method of generating the pitch decision information 84 which is described above is merely one example and it is possible to generate the pitch decision information 84 by any optional method.

The voice sensor signal acquisition unit 102 acquires the voice sensor signal from the voice sensor 43 and supplies the acquired voice sensor signal to the voice value acquisition unit 103. The voice value acquisition unit 103 acquires a voice value which depends on the magnitude of the voice sensor signal which is acquired by the voice sensor signal acquisition unit 102 and supplies voice value information which indicates the acquired voice value to the synthetic ratio decision unit 112.

Specifically, the voice value acquisition unit 103 extracts an envelope of the voice sensor signal which is acquired by the voice sensor signal acquisition unit 102 and acquires a level of the envelope which indicates the magnitude of the voice sensor signal as the voice value.

The breath sensor signal acquisition unit 104 acquires the breath sensor signal from the breath sensor 44 and supplies the acquired breath sensor signal to the breath value acquisition unit 105. The breath value acquisition unit 105 acquires a breath value which depends on the magnitude of the breath sensor signal which is acquired by the breath sensor signal acquisition unit 104 and supplies breath value information which indicates the acquired breath value to the volume decision unit 111 and the synthetic ratio decision unit 112.

Specifically, the breath value acquisition unit 105 extracts an envelope of the breath sensor signal which is acquired by the breath sensor signal acquisition unit 104 and acquires a level of the envelope which indicates the magnitude of the breath sensor signal as the breath value.

The lip sensor signal acquisition unit 106 acquires the lip sensor signal from the lip sensor 46 and supplies the acquired lip sensor signal to the lip position acquisition unit 107. The lip position acquisition unit 107 acquires the lip position depending on a result of detection of the music playing operation of bringing the lips into contact with the mouthpiece 4 which is made by the lip sensor 46 and that the lip sensor signal which is acquired by the lip sensor signal acquisition unit 106 indicates and supplies lip position information which indicates the acquired lip position to the silencing effect value decision unit 110 and the synthetic ratio decision unit 112.

Specifically, the lip position acquisition unit 107 acquires the lip position by substituting the result of detection of the music playing operation of bringing the lips into contact with the mouthpiece 4 that the lip sensor signal which is acquired by the lip sensor signal acquisition unit 106 indicates and which is made by the lip sensor 46 into the following formula (1). In the formula (1), XL denotes an X-coordinate which indicates the lip position, Xi denotes an X-coordinate of the lip sensor 46 to which a number "i" is assigned as an identifier, mi denotes an output value of the lip sensor 46 to which the number "i" is assigned as the identifier. For example, X5 denotes an X-coordinate of the lip sensor 46-5 to which a number "5" is assigned as the identifier and m5 denotes an output value of the lip sensor 46-5. In addition, in the formula (1), N denotes the number of the lip sensors 46. As described above, the electronic wind instrument 1 includes eleven lip sensors 46. Accordingly, N is 11.

[Numerical Formula 1]

$$X_L = \frac{\sum_{i=1}^{N} m_i X_i}{\sum_{i=1}^{N} m_i} \quad (1)$$

The tonguing sensor signal acquisition unit 108 acquires the tongue sensor signal from the tongue sensor 45 and supplies the acquired tongue sensor signal to the tonguing value acquisition unit 109. The tonguing value acquisition unit 109 acquires the tonguing value which depends on the magnitude of the tongue sensor signal which is acquired by the tongue sensor signal acquisition unit 108 and supplies tonguing value information which indicates the acquired tonguing value to the silencing effect value decision unit 110 and the tonguing value transition information storage unit 114. Details of acquisition of the tonguing value by the tonguing value acquisition unit 109 will be described later.

The silencing effect value decision unit 110 decides a silencing effect value which indicates a degree of volume reduction depending on the lip position which is acquired by the lip position acquisition unit 107 and the tonguing value which is acquired by the tonguing value acquisition unit 109 and supplies silencing effect value information which indicates the decided silencing effect value to the volume decision unit 111.

Specifically, the silencing effect value decision unit 110 decides a silencing multiplier which depends on the lip position which is acquired by the lip position acquisition unit 107 in accordance with the silencing effect decision information 87 which is stored in the ROM 8 and which indicates a correspondence relation between the lip position and the silencing multiplier and calculates the silencing effect value by multiplying the tonguing value which is acquired by the tonguing value acquisition unit 109 by the decided silencing multiplier. That is, a relation which is indicated in the following formula (2) is established among the tonguing value, the silencing multiplier and the silencing effect value. In the formula (2), E denotes the silencing effect value, K denotes the silencing multiplier and G denotes the tonguing value. Details of decision of the silencing multiplier by the silencing effect value decision unit 110 will be described later.

[Numerical Formula 2]

$$E = K \times G \quad (2)$$

As indicted in the formula (2), the larger the tonguing value G is, the larger the silencing effect value E is. In addition, as indicated in the formula (2), the larger the silencing multiplier K is, the larger the silencing effect value E is.

The volume decision unit 111 decides a volume of the musical sound depending on the breath value which is acquired by the breath value acquisition unit 105 and the silencing effect value which is decided by the silencing effect value decision unit 110 and supplies volume information which indicates the decided volume to the musical sound output unit 113.

Specifically, the volume decision unit 111 decides a volume which is acquired by reducing the volume which depends on the breath value which is acquired by the breath value acquisition unit 105 depending on the silencing effect value which is decided by the silencing effect value decision unit 110 as the volume of the musical sound.

More specifically, the volume decision unit 111 decides the volume of the musical sound which depends on the breath value which is acquired by the breath value acquisition unit 105 in accordance with the volume decision information 86 which is stored in the ROM 8 and which indicates a correspondence relation between the breath value and the volume of the musical sound.

The volume decision information 86 is configured such that in a case where the breath value is smaller than a breath threshold value which is set in advance, the volume of the musical sound is decided to 0 and in a case where the breath value is larger than the breath threshold value, the volume of the musical sound is decided to a volume which is smaller than a maximum volume which is set in advance and is decided to a larger volume as the breath value becomes larger.

The volume decision information 86 is generated by the external information processing device by experimentally obtaining a correlation between a magnitude of a pressure of the breath of the player and the volume of the musical sound in music playing using the saxophone, setting the breath threshold value and the maximum volume in accordance with the correlation and setting the correspondence relation between the breath value and the volume of the musical sound, then is fetched into the electronic wind instrument 1 and is stored in advance in the ROM 8. The maximum volume is set in advance depending on the maximum value of the volume that the loudspeaker 51 is capable of outputting.

The volume decision unit 111 decides the volume which depends on the breath value and then decides the volume of the musical sound by substituting the volume which depends on the decided breath value and the silencing effect value which is decided by the silencing effect value decision unit 110 into the following formula (3). In the formula (3), J denotes the volume of the musical sound, R denotes the volume which depends on the breath value and E denotes the silencing effect value.

[Numerical Formula 3]

$$J = R \times (1-E) \quad (3)$$

As indicated in the formula (3), the larger the silencing effect value E is, the smaller the volume J of the musical sound is. That is, the larger the silencing effect value E is, the higher the degree of volume reduction is.

The synthetic ratio decision unit 112 decides synthetic ratios of the normal sound waveform data 80, the growl sound waveform data 81, the subtone sound waveform data 82 and the percussive tone sound waveform data 83 depending on the voice value which is acquired by the voice value acquisition unit 103, the breath value which is acquired by the breath value acquisition unit 105 and the lip position which is acquired by the lip position acquisition unit 107 and supplies synthetic ratio information which indicates the decided synthetic ratios to the musical sound output unit 113. Although details will be described later, the musical sound output unit 113 controls the power source unit 11 so as to generate the digital musical sound signal which indicates the musical sound by mixing together the normal sound waveform data 80, the growl sound waveform data 81, the subtone sound waveform data 82 and the percussive tone sound waveform data 83 in accordance with the synthetic ratios which are decided by the synthetic ratio decision unit 112.

Specifically, the synthetic ratio decision unit 112 decides the synthetic ratios in accordance with the synthetic ratio decision information 85 which is stored in the ROM 8. The synthetic ratio decision information 85 indicates a correspondence relation between the breath value and the synthetic ratio of the normal sound waveform data 80, a correspondence relation between the voice value and the synthetic ratio of the growl sound waveform data 81, a correspondence relation between the lip position and the synthetic ratio of the subtone sound waveform data 82 and a correspondence relation between the lip position and the synthetic ratio of the percussive tone sound waveform data 83.

The synthetic ratio decision unit 112 decides the synthetic ratio of the normal sound waveform data 80 which depends on the breath value which is acquired by the breath value acquisition unit 105, decides the synthetic ratio of the growl sound waveform data 81 which depends on the voice value which is acquired by the voice value acquisition unit 103, decides the synthetic ratio of the subtone sound waveform data 82 which depends on the lip position which is acquired by the lip position acquisition unit 107 and decides the synthetic ratio of the percussive tone sound waveform data 83 which depends on the lip position which is acquired by the lip position acquisition unit 107 in accordance with the synthetic ratio decision information 85 respectively.

The synthetic ratio decision information 85 is configured such that the synthetic ratio of the normal sound waveform data 80 is decided to a value which is smaller than 1 and is decided to a larger value as the breath value becomes larger, such that the synthetic ratio of the growl sound waveform data 81 is decided to a value which is smaller than 1 and is decided to a larger value as the voice value becomes larger, such that the synthetic ratio of the subtone sound waveform data 82 is decided to a value which is smaller than 1 and is decided to a larger value as the lip position is located more forward, and such that the synthetic ratio of the percussive tone sound waveform data 83 is decided to a value which is smaller than 1 and is decided to a larger value as the lip position is located more backward.

The synthetic ratio decision information 85 is generated by the external information processing device by experimentally obtaining a correlation among the kind of music playing, the magnitude of the pressure of the player's breath, the magnitude of the player's voice and the lip position in a case where each of four kinds of music playing, that is, the usual playing, the growling, the subtonic playing and the percussive tonic playing is performed by using the saxophone and setting the correspondence relation between the breath value and the synthetic ratio of the normal sound waveform data 80, the correspondence relation between the voice value and the synthetic ratio of the growl sound waveform data 81, the correspondence relation between the lip position and the synthetic ratio of the subtone sound waveform data 82 and the correspondence relation between the lip position and the synthetic ratio of the percussive tone sound waveform data 83 in accordance with the experimentally obtained correlations, then is fetched into the electronic wind instrument 1 and is stored in advance in the ROM 8. Incidentally, the above-mentioned method of generating the synthetic ratio decision information 85 is merely one example and it is possible to generate the synthetic ratio decision information 85 by any optional method.

The musical sound output unit 113 outputs the musical sound which has the pitch which is decided by the pitch decision unit 101 and the volume which is decided by the volume decision unit 111 and which depends on the synthetic ratios which are decided by the synthetic ratio decision unit 112.

Specifically, the musical sound output unit 113 done.

Specifically, the tonguing value acquisition unit 109 includes a special signal processing section 1091, a signal level acquisition section 1092 and a normalization section 1093 as illustrated in FIG. 6.

The special signal processing section 1091 executes special signal processing for making rising of the tongue sensor signal gentle without making falling of the tongue sensor signal gentle on the tongue sensor signal which is acquired by the tongue sensor signal acquisition unit 108.

The signal level acquisition section 1092 acquires the level of the tongue sensor signal on which the special signal processing is executed by the special signal processing section 1091. In addition, the signal level acquisition section 1092 acquires the level of the tongue sensor signal which is acquired by the tongue sensor signal acquisition unit 108. Specifically, the signal level acquisition section 1092 extracts an envelope of the tongue sensor signal and thereby acquires the level of the envelope as the level of the tongue sensor signal.

The normalization section 1093 normalizes the level of the tongue sensor signal which is acquired by the signal level acquisition section 1092 to a value in a range from 0 to 1.

The tonguing value acquisition unit 109 acquires the tonguing value depending on the magnitude of the tongue sensor signal which is obtained after execution of the special signal processing by the special signal processing section 1091. Specifically, the tonguing value acquisition unit 109 acquires the level of the tongue sensor signal which indicates the magnitude of the tongue sensor signal which is obtained after execution of the special signal processing by the special signal processing section 1091 and is normalized by the normalization section 1093 as the tonguing value. The tonguing value acquisition unit 109 acquires the tonguing value which depends on the tonguing time with such a configuration.

Every time the tonguing value is acquired, the tonguing value acquisition unit 109 updates the tonguing value transition information which is stored in the tonguing value transition information storage unit 114 by storing the acquired tonguing value into the tonguing value transition information in correspondence with the time at which the tonguing value is acquired. The time at which the tonguing value is acquired is acquired on the basis of a signal which is supplied from the time counting unit 13 and indicates a result of time counting. controls the sound source unit 11 so as to generate the digital musical sound signal which indicates the musical sound which has the pitch which is decided by the pith decision unit 101 and the volume which is decided by the volume decision unit 111 and which depends on the synthetic ratios which are decided by the synthetic ratio decision unit 112 and then controls the sound emission unit 5 so as to emit the musical sound which depends on the digital musical sound signal which is generated by the sound source unit 11. Details of generation of the digital musical sound signal that the sound source unit 11 conducts in accordance with control by the musical sound output unit 113 will be described later.

The tonguing value transition information storage unit 114 stores tonguing value transition information which indicates time-dependent transition of the tonguing value. Specifically, tonguing values and times at which the tonguing values are acquired are stored in the tonguing value transition information in one-to-one correspondence.

In the following, details of acquisition of the tonguing value by the tonguing value acquisition unit 109 will be described.

The tonguing value acquisition unit 109 acquires the tonguing value which depends on a tonguing time which is the time which has elapsed from start of the tonguing concerned in a case where the tonguing that the player's tongue is brought into contact with the reed 41 is being More specifically, the special signal processing section 1091 includes a rise decision part 1091a and a special signal processing filter 1091b.

The rise decision part 1091a decides whether the tongue sensor signal which is acquired by the tonguing signal acquisition unit 108 is a rise-time signal. Specifically, the rise decision part 1091a decides whether the tongue sensor signal is the rise-time signal depending on a magnitude relation between the level of the tongue sensor signal which indicates the magnitude of the tongue sensor signal which is acquired by the tongue sensor signal acquisition unit 108 and is normalized by the normalization section 1093 and the tonguing value which is previously acquired by the tonguing value acquisition unit 109.

More specifically, the rise decision part 1091a decides whether the tongue sensor signal is the rise-time signal depending on the magnitude relation between the level of the tongue sensor signal which is normalized by the normalization section 1093 and the latest tonguing value that the tonguing value transition information which is stored in the tonguing value transition information storage unit 114 indicates. That is, in a case where the level of the tongue sensor signal which is normalized by the normalization section 1093 and is acquired by the tongue sensor signal acquisition unit 108 is higher than the latest tonguing value that the tonguing value transition information indicates, the rise decision part 1019a decides that the tongue sensor signal is the rise-time signal. On the other hand, in a case where the level of the tongue sensor signal which is normalized by the normalization section 1093 and is acquired by the tongue sensor signal acquisition unit 108 is lower than the latest tonguing value that the tonguing value transition information indicates, the rise decision part 1019a decides that the tongue sensor signal is not the rise-time signal. The latest tonguing value that the tonguing value transition information indicates is the tonguing value which is stored in correspondence with the latest acquisition time and is previously acquired by the tonguing value acquisition unit 109 in the tonguing values which are stored in the tonguing value transition information.

The special signal processing filter 1091b is a signal processing filter for making rising of an input signal gentle. Specifically, the special signal processing filter 1091b is an IIR (Infinite Impulse Response) filter.

A filter coefficient of the special signal processing filter 1091b which is the IIR filter is set by conducting an experiment for acquiring a degree of similarity between a musical sound obtained when playing music by using the electronic wind instrument 1 while changing a numerical value which is set as the filter coefficient and a musical sound obtained when playing music by using the saxophone so as to obtain a correlation between the numerical value which is set as the filter coefficient and the similarity degree and setting a numerical value with which the similarity degree becomes the highest as the filter coefficient in accordance with the correlation. Incidentally, the above-mentioned filter coefficient setting method is merely one example and it is possible to set the filter coefficient by any optional method.

In a case where it is decided that the tongue sensor signal which is acquired by the tongue sensor signal acquisition unit 108 is the rise-time signal by the rise decision part 1091a, the special signal processing section 1091 inputs the tongue sensor signal into the special signal processing filter 1091b and outputs a signal which is output from the special signal processing filter 1091b in response to the input. On the other hand, in a case where it is decided that the tongue sensor signal which is acquired by the tongue sensor signal acquisition unit 108 is not the rise-time signal by the rise decision part 1091a, the special signal processing section 1091 outputs the tongue sensor signal without inputting the tongue sensor signal into the special signal processing filter 1091b. The special signal processing section 1091 executes the special signal processing for making rising of the tongue sensor signal gentle without making falling of the tongue sensor signal gentle on the tongue sensor signal which is acquired by the tongue sensor signal acquisition unit 108 with such a configuration.

Figure 7A:
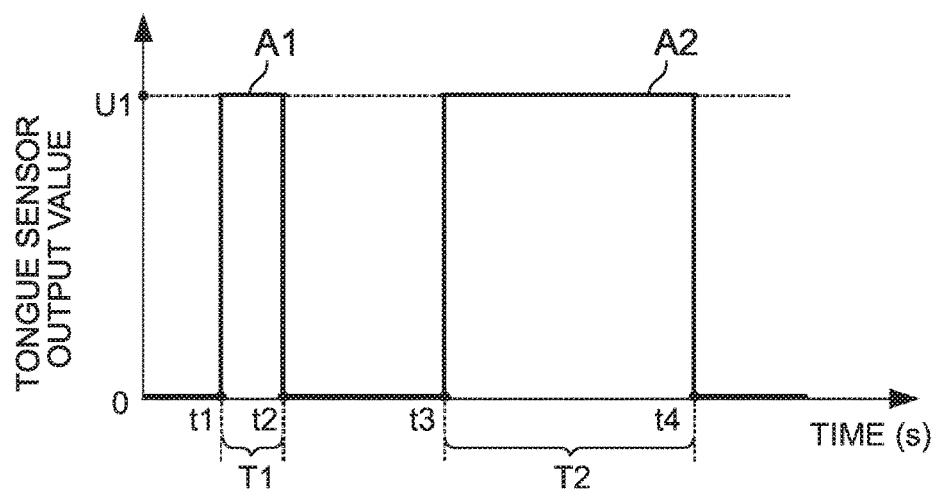
FIG. 7A is a diagram illustrating one example of a waveform of a tongue sensor signal.

In the following, acquisition of the tonguing value by the tonguing value acquisition unit 109 will be described by giving a case where the player does the legato tonguing one time and then does the usual tonguing one time by using the electronic wind instrument 1 and the tongue sensor 45 outputs a tongue sensor signal which has signal waveforms which are illustrated in FIG. 7A in response to the music playing operation that the player performs by way of example.

The tongue sensor signal which is illustrated in FIG. 7A includes a first signal waveform A1 and a second signal waveform A2 as the signal waveforms. In the following, description will be made by giving a case where a maximum value of an output value of the tongue sensor 45 is a first value U1 in the first signal waveform A1 and the second signal waveform A2 by way of example.

The first signal waveform A1 is the signal waveform of the tongue sensor signal which is output in response to the legato tonguing. That is, a time t1 at which the first waveform A1 rises is the time at which the player's tongue is brought into contact with the reed 41 and the legato tonguing is started. A time t2 at which the first signal waveform A1 falls is the time at which the player's tongue is separated from the reed 41 and the legato tonguing is terminated. A first time T1 from the time t1 to the time t2 is the time period for which the legato tonguing is being done and the player's tongue is in contact with the reed 41. In the first signal waveform A1, a time which has elapsed from the time t1 corresponds to the tonguing time for which the legato tonguing is being done.

The second signal waveform A2 is the signal waveform of a tongue sensor signal which is output in response to the usual tonguing. That is, a time t3 at which the second signal waveform A2 rises is the time at which the player's tongue is brought into contact with the reed 41 and the usual tonguing is started. A time t4 at which the second signal waveform A2 falls is the time at which the player's tongue is separated from the reed 41 and the usual tonguing is terminated. A second time T2 from the time t3 to the time t4 is the time period for which the usual tonguing is being done and the player's tongue is in contact with the reed 41. In the second signal waveform A2, a time which has elapsed from the time t3 corresponds to the tonguing time for which the usual tonguing is being done.

Figure 7B:
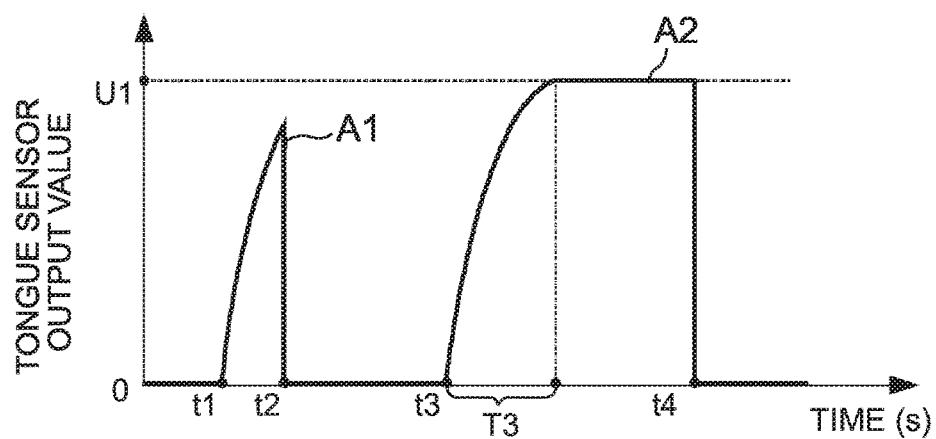
FIG. 7B is a diagram illustrating one example of a waveform of the tongue sensor signal which is obtained after execution of special signal processing thereon.

In the following, description will be made by giving a case where the special signal processing section 1091 executes the special signal processing on the tongue sensor signal which is illustrated in FIG. 7A and thereby a tongue sensor signal which is illustrated in FIG. 7B is acquired by way of example. In addition, in the following, description will be made by giving a case where a third time T3 is taken from when the tongue sensor signal which is illustrated in FIG. 7B and is obtained after execution of the special signal processing on the tongue sensor signal(thereon) begins rising to when the output value of the tongue sensor 45 reaches the first value U1 by way of example. In addition, in the following, description will be made by giving a case where the first time T1 is shorter than the third time T3 and the second time T2 is longer than the time T3 by way of example.

As illustrated in FIG. 7B, in both the first signal waveform A1 and the second signal waveform A2 which are obtained after execution of the special signal processing thereon, rising is made gentle without making falling gentle.

Specifically, the first signal waveform A1 which is obtained after execution of the special signal processing thereon begins rising at the time t1 and falls at the time t2. In the first signal waveform A1 which is obtained after execution of the special signal processing thereon, the output value of the tongue sensor 45 is smaller than the first value U1 and becomes larger as the time which has elapsed from the time t1, that is, the tonguing time becomes longer.

The second signal waveform A2 which is obtained after execution of the special signal processing thereon begins rising at the time t3 and falls at the time t4. In the second signal waveform A2 which is obtained after execution of the special signal processing thereon, in a case where the time which has elapsed from the time t3, that is, the tonguing time is longer than the third time T3, the output value of the tonguing sensor 45 reaches the first value U1. In addition, in the second signal waveform A2 which is obtained after execution of the special signal processing thereon, in a case where the time which has elapsed from the time t3 is shorter than the third time T3, the output value of the tongue sensor 45 is smaller than the first value U1 and becomes larger as the time which has elapsed from the time t3 becomes longer.

Figure 7C:
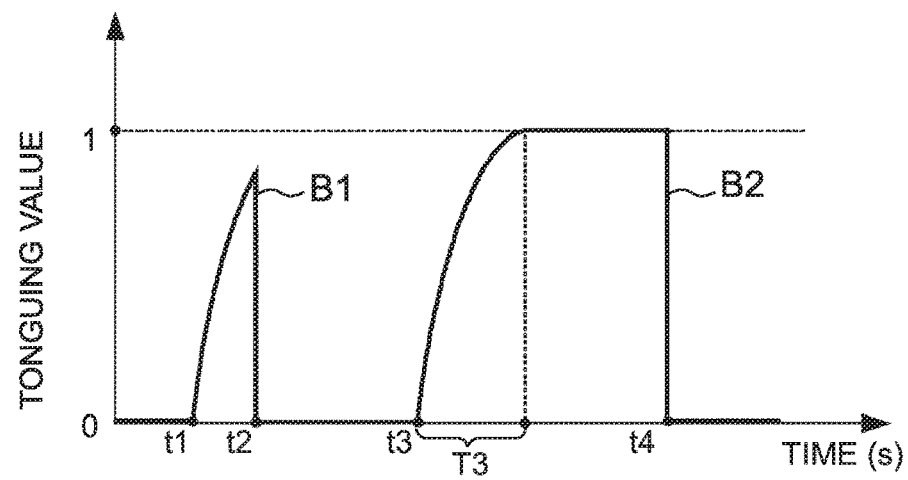
FIG. 7C is a diagram illustrating one example of time-dependent transition of a tonguing value.

In the following, description will be made by giving a case where the tonguing value acquisition unit 109 acquires the level of the tongue sensor signal which indicates the magnitude of the tongue sensor signal which is illustrated in FIG. 7B and is obtained after execution of the special signal processing thereon and which is normalized by the normalization section 1093 as the tonguing value by way of example. FIG. 7C illustrates one example of time-dependent transitions of the tonguing value which is acquired by the tonguing value acquisition unit 109 in this case. In addition, in the following, description will be made by giving a case where the tonguing value becomes 1 when the first value U1 is normalized to a value in the range from 0 to 1 by way of example.

As illustrated in FIG. 7C, the tonguing value acquisition unit 109 acquires the tonguing value which depends on the tonguing time by acquiring the tonguing value depending on the magnitude of the tongue sensor signal which is illustrated in FIG. 7B and is obtained after execution of the special signal processing.

Specifically, a first transition waveform B1 and a second transition waveform B2 are included as waveforms which indicate transitions of the tonguing value illustrated in FIG. 7C. The first transition waveform B1 indicates the transition of the tonguing value which is acquired depending on the first signal waveform A1 which is obtained after execution of the special signal processing thereon. The second transition waveform B2 indicates the transition of the tonguing value which is acquired depending on the second signal waveform A2 which is obtained after execution of the special signal processing thereon.

In correspondence with a situation where in the first signal waveform A1 which is obtained after execution of the special signal processing thereon, the output value of the tongue sensor 45 is smaller than the first value U1 and becomes larger as the time which has elapsed from the time t1, that is, the tonguing time becomes longer, in the first transition waveform B1, the tonguing value is smaller than 1 and becomes larger as the time which has elapsed from the time t1 becomes longer.

As described above, in the second signal waveform A2 which is obtained after execution of the special signal processing thereon, in a case where the time which has elapsed from the time t3, that is, the tonguing time is longer than the third time T3, the output value of the tongue sensor 45 is the first value U1. In correspondence with this situation, in the second transition waveform B2, in a case where the time which has elapsed from the time t3 is longer than the third time T3, the tonguing value is 1. In addition, in the second signal waveform A2 which is obtained after execution of the special signal processing thereon, in a case where the time which has elapsed from the time t3 is shorter than the third time T3, the output value of the tongue sensor 45 is smaller than the first value U1 and becomes larger as the time which has elapsed from the time t3 becomes longer. In correspondence with this situation, in the second transition waveform B2, in a case where the time which has elapsed from the time t3 is shorter than the third time T3, the tonguing value is smaller than 1 and becomes larger as the time which has elapsed from the time t3 becomes longer.

The third time T3 is one example of a special time. In addition, 1 is one example of a special value.

As described above, the larger the tonguing value is, the larger the silencing effect value is and, the larger the silencing effect value is, the higher the degree of volume reduction is. Accordingly, in the example which is illustrated in FIG. 7C, in a case where the tonguing time is shorter than the third time T3, the degree of volume reduction is lower than the degree of volume reduction obtained in a case where the tonguing time is longer than the third time T3, and the longer the tonguing time is, the higher the degree of volume reduction is.

Accordingly, in a case where the player does the tonguing concerned by using the electronic wind instrument 1, it becomes possible for the player to reproduce a musical performance expression which is given in a case where the legato tonguing is done by using the saxophone by performing a music playing operation of adjusting the time for which the tongue is in contact with the reed 41 so as to become shorter than the third time T3. That is, in music playing using the electronic wind instrument 1, it becomes possible to reproduce the musical performance expression which is given in a case where the legato tonguing is done by using the saxophone by a simple music playing operation.

In addition, in a case where the player does the tonguing concerned by using the electronic wind instrument 1, it becomes possible for the player to reproduce a musical performance expression which is given in a case where the usual tonguing is done by using the saxophone by performing a music playing operation of adjusting the time for which the tongue is in contact with the reed 41 so as to become longer than the third time T3. That is, in a case of music playing using the electronic wind instrument 1, it becomes possible to reproduce the musical performance expression which is given in a case where the usual tonguing is done by using the saxophone by the simple music playing operation.

Next, details of decision of the silencing multiplier by the silencing effect value decision unit 110 will be described. As described above, the silencing effect value decision unit 110 calculates a silencing effect value by deciding the silencing multiplier which depends on the lip position which is acquired by the lip position acquisition unit 107 and multiplying the tonguing value which is acquired by the tonguing value acquisition unit 109 by the decided silencing multiplier in accordance with the silencing effect decision information 87.

Figure 8:
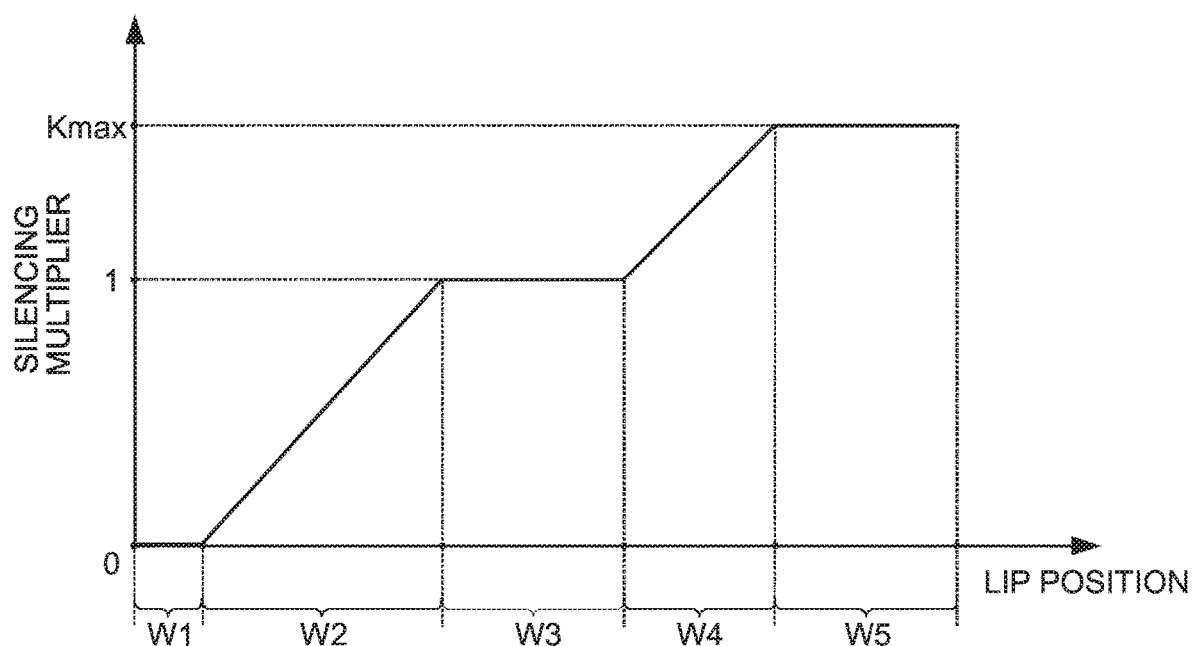
FIG. 8 is a diagram illustrating a configuration example of silencing effect decision information.

As illustrated in FIG. 8, the silencing effect decision information 87 is configured such that the silencing multiplier is decided to a value which is smaller than a maximum value Kmax of the silencing multiplier which is set in advance and is decided to a larger value as the lip position is located more backward.

Specifically, in the first embodiment, a first range W1, a second range W2, a third range W3, a fourth range W4 and a fifth range W5 are set on an X-axis and the silencing multiplier is decided depending on within which range the X-coordinate which indicates the lip position falls.

The first range W1 is set in front of the second range W2, the second range W2 is set in front of the third range W3, the third range W3 is set in front of the fourth range W4 and the fourth range W4 is set in front of the fifth range W5. The second range W2 corresponds to the lip position which is obtained in a case where the subtonic playing is performed by using the electronic wind instrument 1. The third range W3 corresponds to the lip position which is obtained in a case where the usual music playing is performed by using the electronic wind instrument 1. The fourth range W4 corresponds to the lip position which is obtained in a case where the percussive tonic playing is performed by using the electronic wind instrument 1.

In a case where the X-coordinate which indicates the lip position falls within the first range W1, the silencing multiplier is decided to 0. In a case where the X-coordinate which indicates the lip position falls within the second range W2, the silencing multiplier is decided to a value which is larger than 0 and smaller than 1 and is decided to a larger value as the lip position is located more backward. In a case where the X-coordinate which indicates the lip position falls within the third range W3, the silencing multiplier is decided to 1. In a case where the X-coordinate which indicates the lip position falls within the fourth range W4, the silencing multiplier is decided to a value which is larger than 1 and is smaller than the maximum value Kmax of the silencing multiplier and is decided to a larger value as the lip position is located more backward. In a case where the X-coordinate which indicates the lip position falls within the fifth range W5, the silencing multiplier is decided to the maximum value Kmax of the silencing multiplier.

That is, in a case where the X-coordinate which indicates the lip position falls within the second range W2 which is set in front of the third range W3 which corresponds to the lip position which is obtained when performing the usual music playing, the silencing multiplier is decided to a value which is smaller than a value which is decided in a case where the X-coordinate which indicates the lip position falls within the third range W3. In addition, in a case where the X-coordinate which indicates the lip position falls within the fourth range W4 which is set behind the third range W3, the silencing multiplier is decided to a value which is larger than a value which is decided in a case where the X-coordinate which indicates the lip position falls within the third range W3.

As described above, the larger the silencing multiplier is, the larger the silencing effect value is, and the larger the silencing effect value is, the higher the volume reduction degree is. Accordingly, in a case where the X-coordinate which indicates the lip position falls within the second range W2, the volume reduction degree becomes lower than the volume reduction degree which is attained in a case where the X-coordinate which indicates the lip position falls within the third range W3 and the (legato or usual) tonguing-based musical performance expression which is comparable with an expression which is given in a case where the subtonic playing is performed by using the saxophone is reproduced. In addition, in a case where the X-coordinate which indicates the lip position falls within the fourth range W4, the volume reduction degree becomes higher than the volume reduction degree which is attained in a case where the X-coordinate which indicates the lip position falls within the third range W3 and the (legato or usual) tonguing-based musical performance expression which is comparable with an expression which is given in a case where the percussive tonic playing is performed by using the saxophone is reproduced.

In a case of playing music by using the electronic wind instrument 1, it becomes possible for the player to reproduce the musical performance expression which is given in a case where the subtonic playing or the percussive tonic playing is performed by using the saxophone by performing the music playing operation of adjusting the lip position with such a configuration. That is, it becomes possible for the player to reproduce the musical performance expression which is given in a case where the subtonic playing or the percussive tonic playing is performed by using the saxophone in music playing using the electronic wind instrument 1 by the simple music playing operation with such a configuration.

The silencing effect decision information 87 is generated by the external information processing device by experimentally obtaining each correlation among the kind of music playing, the lip position and the volume of the musical sound in a case where each of three kinds of music playing, that is, the usual playing, the subtonic playing and the percussive tonic playing is performed by using the saxophone, setting the first range W1, the second range W2, the third range W3, the fourth range W4 and the fifth range W5 in accordance with the obtained correlations and setting the correspondence relation between the lip position and the silencing multiplier, then is fetched into the electronic wind instrument 1 and is stored in advance in the ROM 8. Incidentally, the above-mentioned method of generating the silencing effect decision information 87 is merely one example and it is possible to generate the silencing effect decision information 87 by any optional method.

Next, details of generation of the digital musical sound signal according to control by the musical sound output unit 113 that the sound source unit 11 performs will be described with reference to FIG. 9.

Figure 9:
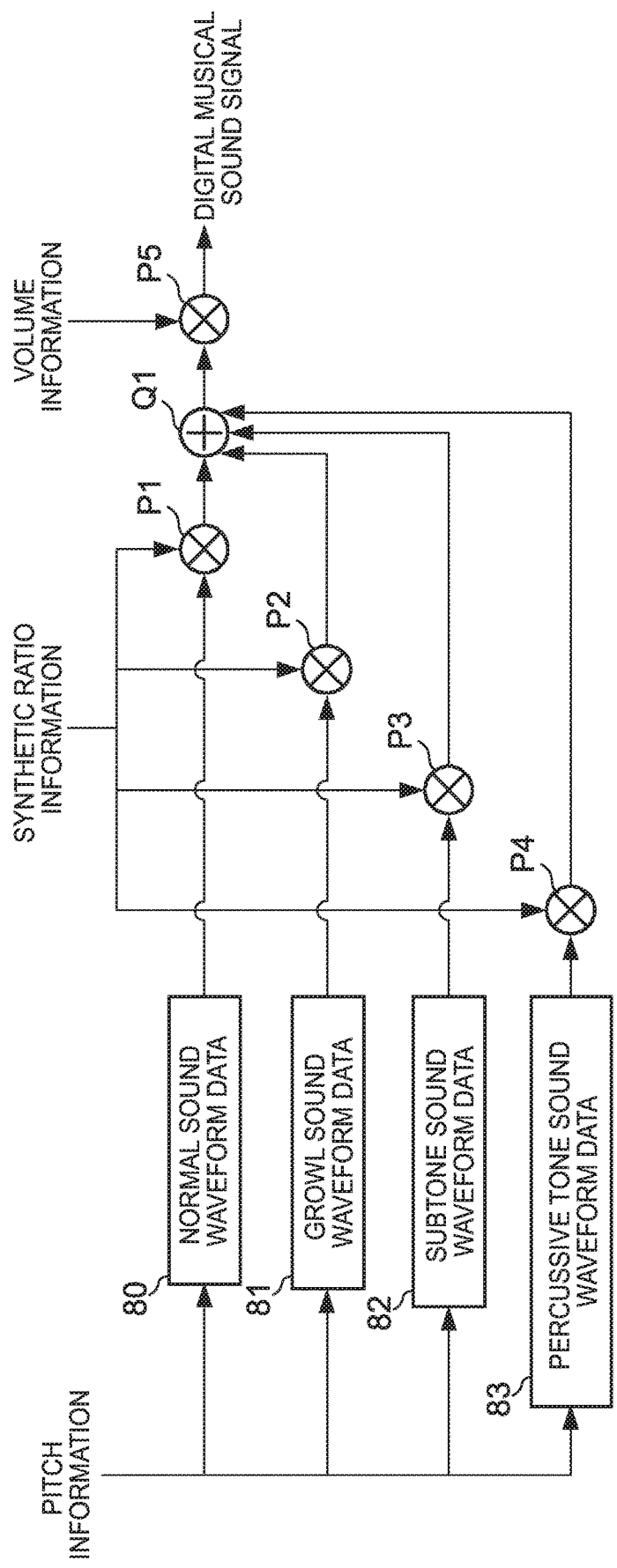
FIG. 9 is an explanatory diagram illustrating one example of digital musical sound signal generation that the electronic wind instrument according to the first embodiment of the present invention executes.

The sound source unit 11 includes a first multiplier P1, a second multiplier P2, a third multiplier P3, a fourth multiplier P4, a fifth multiplier P5 and an adder Q1 as illustrated in FIG. 9.

The musical sound output unit 113 controls the sound source unit 11 so as to acquire the normal sound waveform data 80, the growl sound waveform data 81, the subtone sound waveform data 82 and the percussive tone sound waveform data 83 which depend on the pitch of the musical sound that the pitch information indicates from the ROM 8.

The musical sound output unit 113 controls the first multiplier P1 so as to multiply the normal sound waveform data 80 which is acquired from the ROM 8 by a multiplier which depends on the synthetic ratio of the normal sound waveform data 80 that the synthetic ratio information indicates.

The musical sound output unit 113 controls the second multiplier P2 so as to multiply the growl sound waveform data 81 which is acquired from the ROM 8 by a multiplier which depends on the synthetic ratio of the growl sound waveform data 81 that the synthetic ratio information indicates.

The musical sound output unit 113 controls the third multiplier P3 so as to multiply the subtone sound waveform data 82 which is acquired from the ROM 8 by a multiplier which depends on the synthetic ratio of the subtone sound waveform data 82 that the synthetic ratio information indicates.

The musical sound output unit 113 controls the fourth multiplier P4 so as to multiply the percussive tone sound waveform data 83 which is acquired from the ROM 8 by a multiplier which depends on the synthetic ratio of the percussive tone sound waveform data 83 that the synthetic ratio information indicates.

The musical sound output unit 113 controls the adder Q1 so s to add an output value of the second multiplier P2, an output value of the third multiplier P3 and an output value of the fourth multiplier P4 to an output value of the first multiplier P1. The normal sound waveform data 80, the growl sound waveform data 81, the subtone sound waveform data 82 and the percussive tone sound waveform data 83 which are acquired from the ROM 8 are mixed together in accordance with the synthetic ratios that the synthetic ratio decision unit 112 decides with such a configuration.

The musical sound output unit 113 controls the fifth multiplier P5 so as to multiply an output value of the adder Q1 by a multiplier which depends on the volume that the volume information indicates.

The musical sound output unit 113 controls the sound source unit 11 so as to supply an output value of the fifth multiplier P5 to the sound emission unit 5 as the digital musical sound signal.

The sound source unit 11 generates the digital musical sound signal which indicates the musical sound which has the pitch which is decided by the pitch decision unit 101 and the volume which is decided by the volume decision unit 111 and which depends on the synthetic ratios which are decided by the synthetic ratio decision unit 112 in accordance with control by the musical sound output unit 113 with such a configuration.

In the following, main control processing that the electronic wind instrument 1 which includes the above-mentioned physical and functional configurations executes will be described with reference to a flowchart in FIG. 10.

The electronic wind instrument 1 fetches and stores in advance in the ROM 8 the normal sound waveform data 80, the growl sound waveform data 81, the subtone sound waveform data 82, the percussive tone sound waveform data 83, the pitch decision information 84, the synthetic ratio decision information 85, the volume decision information 86 and the silencing effect decision information 87.

Figure 10:
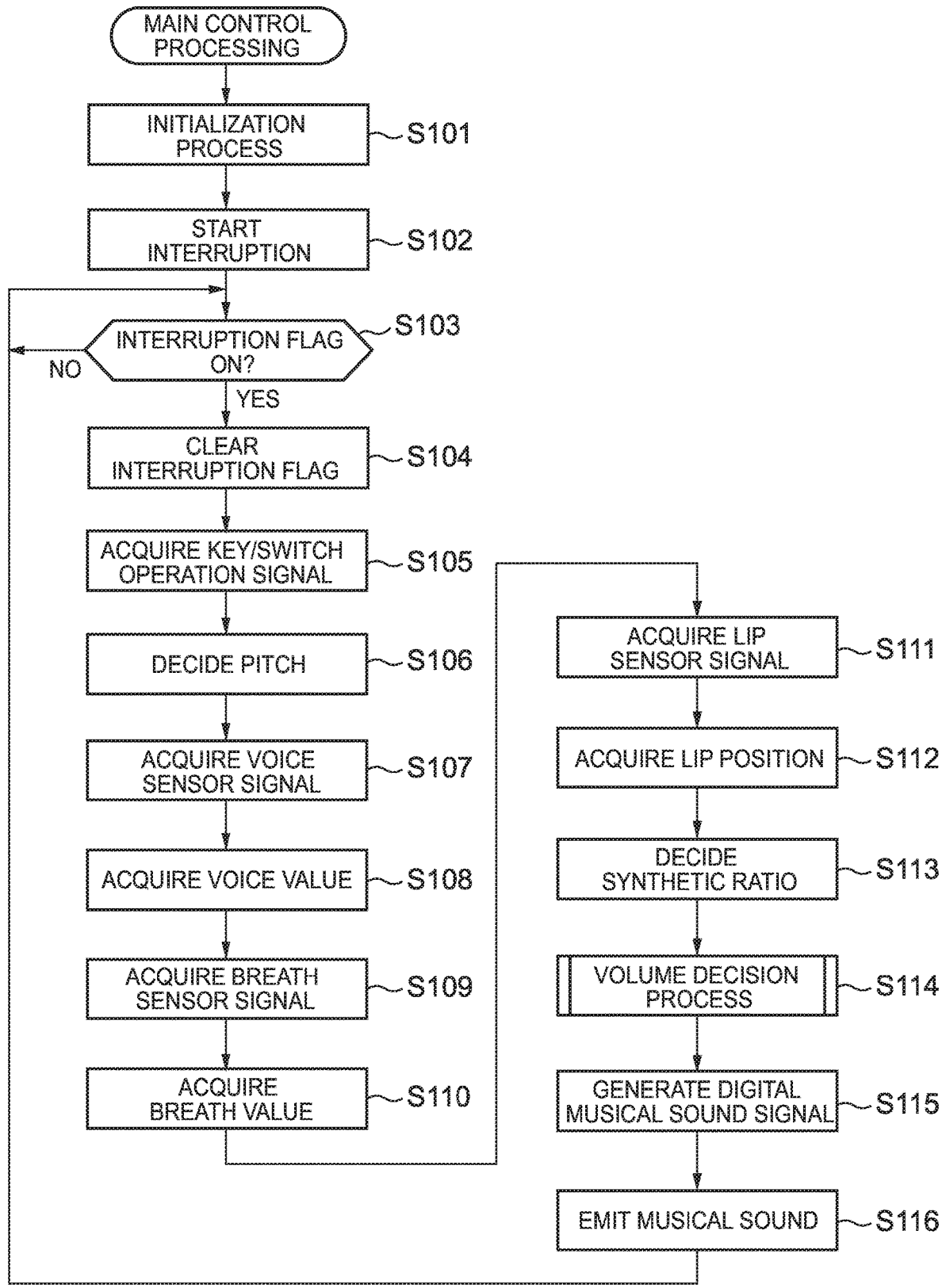
FIG. 10 is a flowchart illustrating one example of main control processing that the electronic wind instrument according to the first embodiment of the present invention executes.

In this state, in a case where the player turns on the power source of the electronic wind instrument 1 by operating the power switch that the operation switch 6 includes, the CPU 7 starts execution of the main control processing which is illustrated in the flowchart in FIG. 10.

In a case where execution of the main control processing is started, first, the CPU 7 executes an initialization process so as to clear the storage areas of the RAM 9 (step S101). Then, the CPU 7 sets interruption (step S102). After execution of the process in step S102, an interruption request signal is supplied from the time counting unit 13 to the CPU 7 every time the time counting unit 13 detects elapse of a sampling time which is set in advance until execution of the main control processing is terminated. In the first embodiment, the sampling time is set to 4 ms. In a case where the interruption request signal is supplied from the time counting unit 13, the CPU 7 sets an interruption flag which is constructed in the storage area of the RAM 9 to an on-state.

After execution of the process in step S102, the CPU 7 decides whether the interruption flag is in the on-state (step S103). In a case where it is decided that the interruption flag is not in the on-state (step S103; No), the process returns to step S103. On the other hand, in a case where it is decided that the interruption flag is in the on-state (step S103; Yes), the CPU 7 clears the interruption flag and sets the interruption flag to an off-state (step S104) and executes processes in step S105 to step S116. After execution of the processes in step S105 to step S116, the process returns to step S103. The processes in step S105 to step S116 are executed every time the sampling time elapses with such a configuration.

In step S105, the key/switch operation signal acquisition unit 100 acquires the key/switch operation signal from the key/switch operation detection unit 10 (step S105). After execution of the process in step S105, the pitch decision unit 101 decides the pitch of the musical sound depending on a result of detection of the key/switch operation by the key/switch operation detection unit 10 that the key/switch operation signal which is acquired in step S105 indicates in accordance with the pitch decision information 84 (step S106).

After execution of the process in step S106, the voice sensor signal acquisition unit 102 acquires the voice sensor signal from the voice sensor 43 (step S107). After execution of the process in step S107, the voice value acquisition unit 103 acquires the voice value which depends on the magnitude of the voice sensor signal which is acquired in step S107 (step S108).

After execution of the process in step S108, the breath sensor signal acquisition unit 104 acquires the breath sensor signal from the breath sensor 44 (step S109). After execution of the process in step S109, the breath value acquisition unit 105 acquires the breath value which depends on the magnitude of the breath sensor signal which is acquired in step S109 (step S110).

After execution of the process in step S110, the lip sensor signal acquisition unit 106 acquires the lip sensor signal from the lip sensor 46 (step S111). After execution of the process in step S111, the lip position acquisition unit 107 acquires the lip position depending on a result of detection of the music playing operation of bringing the lips into contact with the mouthpiece 4 that the lip sensor signal which is acquired in step S111 indicates and which is made by the lip sensor 46 (step S112).

After execution of the process in step S112, the synthetic ratio decision unit 112 decides the synthetic ratios of the normal sound waveform data 80, the growl sound waveform data 81, the subtone sound waveform data 82 and the percussive tone sound waveform data 83 depending on the voice value which is acquired in step S108, the breath value which is acquired in step S110 and the lip position which is acquired in step S112 in accordance with the synthetic ratio decision information 85 (step S113).

After execution of the process in step S113, the CPU 7 executes a volume decision process so as to decide the volume of the musical sound (step S114). Details of the volume decision process will be described later.

After execution of the process in step S114, the musical sound output unit 113 makes the sound source unit 11 generate the digital musical sound signal which indicates the musical sound which has the pitch which is decided in step S106 and the volume which is decided in step S114 and which depends on the synthetic ratios which are decided in step S113 (step S115).

After execution of the process in step S115, the musical sound output unit 113 makes the sound emission unit 5 emit the musical sound which depends on the digital musical sound signal which is generated in step S115 (step S116). After execution of the process in step S116, the process returns to step S103.

In a case where the player turns off the power source of the electronic wind instrument 1 by operating the power switch, the CPU 7 terminates execution of the main control processing which is illustrated in the flowchart in FIG. 10.

In the following, details of the volume decision process which is executed in step S114 will be described with reference to a flowchart in FIG. 11.

In a case where execution of the volume decision process is started, the CPU 7 executes a tonguing value acquisition process and thereby acquires the tonguing value (step S201). Details of the tonguing value acquisition process will be described later.

After execution of the process in step S201, the silencing effect value decision unit 110 decides the silencing multiplier which depends on the lip position which is acquired in step S112 in accordance with the silencing effect decision information 87 (step S202).

After execution of the process in step S202, the silencing effect value decision unit 110 calculates the silencing effect value by multiplying the tonguing value which is acquired in step S201 by the silencing multiplier which is decided in step S202 (step S203).

After execution of the process in step S203, the volume decision unit 111 decides the volume which depends on the breath value which is acquired in step S110 in accordance with the volume decision information 86 (step S204).

After execution of the process in step S204, the volume decision unit 111 decides a volume which is obtained by reducing the volume which depends on the breath value which is decided in step S204 depending on the silencing effect value which is calculated in step S203 as the volume of the musical sound (step S205) and thereby terminates execution of the volume decision process.

Figure 12:
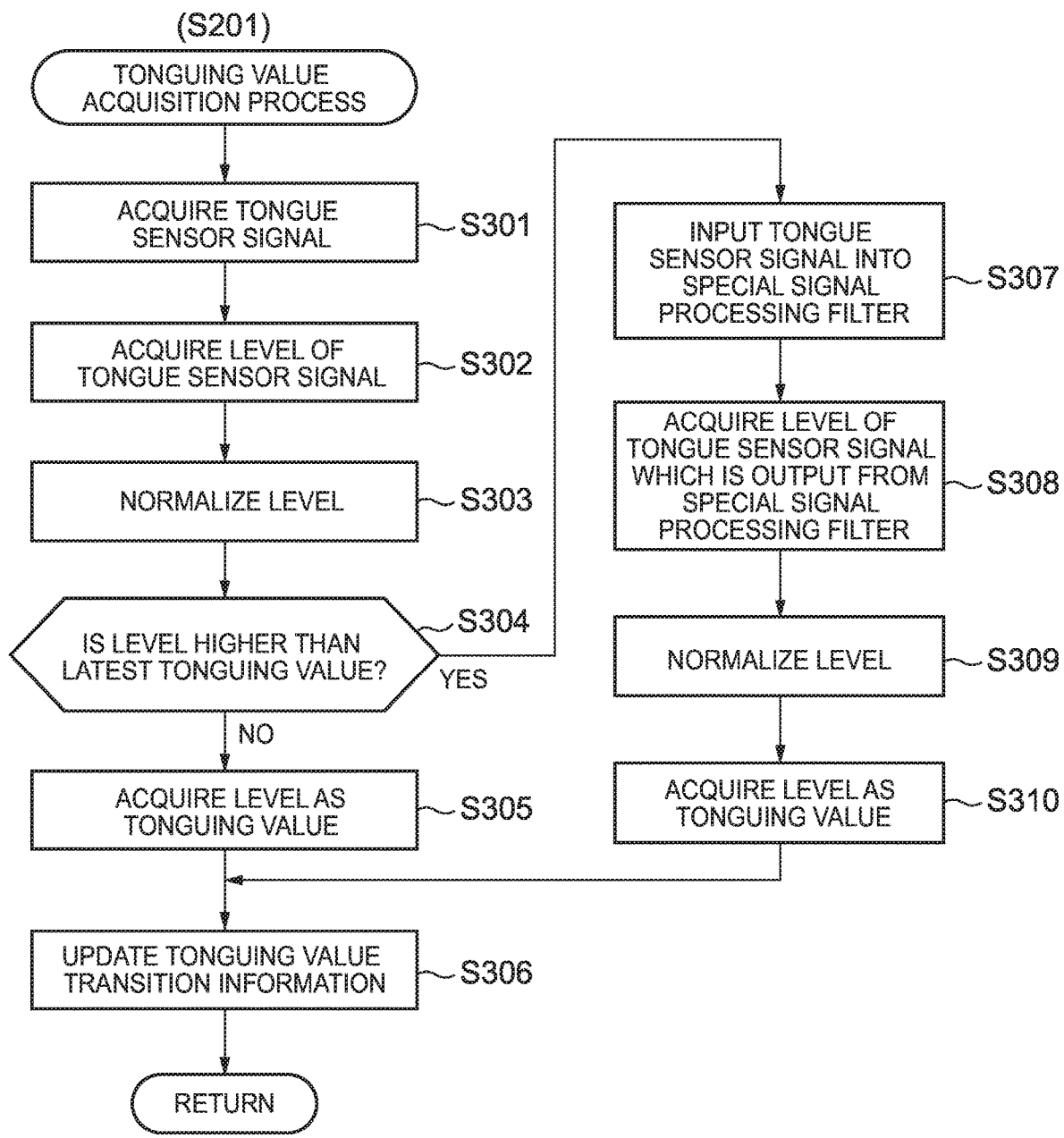
FIG. 12 is a flowchart illustrating one example of a tonguing value acquisition process that the electronic wind instrument according to the first embodiment of the present invention executes.

In the following, details of the tonguing value acquisition process which is executed in step S201 will be described with reference to a flowchart in FIG. 12.

In a case where execution of the tonguing value acquisition process is started, first, the tongue sensor signal acquisition unit 108 acquires the tongue sensor signal from the tongue sensor 45 (step S301). After execution of the process in step S301, the signal level acquisition section 1092 acquires the level of the tongue sensor signal which is acquired in step S301 (step S302). After execution of the process in step S302, the normalization section 1093 normalizes the level of the tongue sensor signal which is acquired in step S302 to a value in the range from 0 to 1 (step S303).

After execution of the process in step S303, the rise decision part 1091a decides whether the level of the tongue sensor signal which is normalized in step S303 is higher than the latest tonguing value that the tonguing value transition information which is stored in the tonguing value transition information storage unit 114 indicates and thereby decides whether the tongue sensor signal which is acquired in step S301 is the rise-time signal (step S304). Incidentally, the latest tonguing value that the tonguing value transition information indicates is the tonguing value which is acquired in the tonguing value acquisition process which is previously executed.

In a case where it is decided that the level of the tongue sensor signal which is normalized in step S303 is lower than the latest tonguing value that the tonguing value transition information indicates (step S304; No), the tonguing value acquisition unit 109 acquires the level of the tongue sensor signal which is normalized in step S303 as the tonguing value (step S305). After execution of the process in step S305, the tonguing value acquisition unit 109 updates the tonguing value transition information by storing the tonguing value which is acquired in step S305 into the tonguing value transition information in correspondence with the time at which the tonguing value is acquired (step S306) and terminates execution of the tonging value acquisition process.

In a case where it is decided that the level of the tongue sensor signal which is normalized in step S303 is higher than the latest tonguing value that the tonguing value transition information indicates in step S304 (step S304; Yes), the special signal processing section 1091 inputs the tongue sensor signal which is acquired in step S301 into the special signal processing filter 1091b (step S307). After execution of the process in step S307, the signal level acquisition section 1092 acquires the level of the tongue sensor signal which is output from the special signal processing filter 1091b in response to input of the tongue sensor signal in step S307 (step S308). After execution of the process in step S308, the normalization section 1093 normalizes the level of the tongue sensor signal which is acquired in step S308 to a value in the range from 0 to 1 (step S309).

The tonguing value acquisition unit 109 acquires the level of the tongue sensor signal which is normalized in step S309 as the tonguing value (step S310). After execution of the process in step S310, the tonguing value acquisition unit 109 updates the tonguing value transition information by storing the tonguing value which is acquired in step S310 into the tonging value transition information in correspondence with the time at which the tonguing value is acquired (step S306) and terminates execution of the tonguing value acquisition process.

As described above, the electronic wind instrument 1 acquires the tonguing value depending on the magnitude of the tongue sensor signal which is obtained after execution of the special signal processing and thereby acquires the tonguing value which depends on the tonguing time, decides the silencing effect value depending on the acquired tonguing value and outputs the musical sound which has the volume which is acquired by reducing the volume which depends on the breath value depending on the decided silencing effect value. In music playing using the electronic wind instrument 1, it becomes possible to reproduce the musical performance expression which is given in a case where the legato tonguing is done by using the saxophone which is the natural woodwind instrument by the simple music playing operation with such a configuration.

Incidentally, in the first embodiment, although description is made on the presumption that the special signal processing filter 1091b is configured by the IIR filter, this configuration is merely one example and the special signal processing filter 1091b may be any optional signal processing filter which makes rising of the tongue sensor signal gentle. For example, the special signal processing filter 1091b may be configured by an FIR (Finite Impulse Response) filter. Incidentally, in this case, the filter coefficient of the special signal processing filter 1091b which is configured by the FIR filter may be set by conducting an experiment for acquiring the degree of similarity between the musical sound obtained when playing music by using the electronic wind instrument 1 while changing a numerical value which is set as the filter coefficient and the musical sound which is obtained when playing music by using the saxophone so as to obtain the correlation between the numerical value which is set as the filter coefficient and the degree of similarity and setting a numerical value with which the degree of similarity becomes the highest as the filter coefficient in accordance with the obtained correlation. Incidentally, the above-mentioned filter coefficient setting method is merely one example and it is possible to set the filter coefficient by any optional method.

Incidentally, in the first embodiment, description is made on the presumption that the rise decision part 1091a is configured to decide whether the tongue sensor signal is the rise-time signal depending on the magnitude relation between the level of the tongue sensor signal which is normalized by the normalization section 1093 and the latest tonguing value that the tonguing value transition information which is stored in the tonguing value transition information storage unit 114 indicates and thereby to decide whether the tongue sensor signal is the rise-time signal depending on the magnitude relation between the normalized tongue sensor signal level and the tonguing value which is previously acquired by the tonguing value acquisition unit 109. However, this configuration is merely one example and it is also possible for the rise decision part 1091a to decide whether the tongue sensor signal is the rise-time signal depending on the magnitude relation between the level of the tongue sensor signal which is normalized by the normalization section 1093 and the tonguing value which is previously acquired by the tonguing value acquisition unit 109 by any optional method.

For example, the special signal processing filter 1091b may be configured to store the tonguing value which is previously acquired by the tonguing value acquisition unit 109 and the rise decision part 1091a may be configured to decide whether the tongue sensor signal is the rise-time signal depending on the magnitude relation between the level of the tongue sensor signal which is normalized by the normalization section 1093 and the previously acquired tonguing value which is stored in the special signal processing filter 1091b. In this case, the tonguing value acquisition unit 109 may be configured to include a second or higher order IIR filter or a second or higher order FIR filter which stores the tonguing values which are acquired by the tonguing value acquisition unit 109 into an FIFO (First In, First Out) buffer in order as the special signal processing filter 1091b.

Second Embodiment

In the first embodiment, description is made on the presumption that the electronic wind instrument 1 is configured to acquire the tonguing value which depends on the tonguing time by acquiring the tonguing value depending on the magnitude of the tongue sensor signal which is obtained after execution of the special signal processing thereon. However, this configuration is merely one example and it is possible for the electronic wind instrument 1 to acquire the tonguing value which depends on the tonguing time by any optional method. In the following, the electronic wind instrument 1 which is configured to measure the tonguing time, to calculate the tonguing value by multiplying the normalized tongue sensor signal level which indicates the magnitude of the tongue sensor signal by the tonguing multiplier which depends on the measured tonguing time and thereby to acquire the tonguing value which depends on the tonguing time will be described.

Although physical and functional configurations that the electronic wind instrument 1 according to the second embodiment includes are almost the same as the physical and functional configurations that the electronic wind instrument 1 according to the first embodiment includes, the former is partially different from the latter. In the following, the physical and functional configurations that the electronic wind instrument 1 according to the second embodiment includes will be described with a focus on differences in the physical and functional configurations between the electronic wind instruments 1 according to the first and second embodiments.

Figure 13:
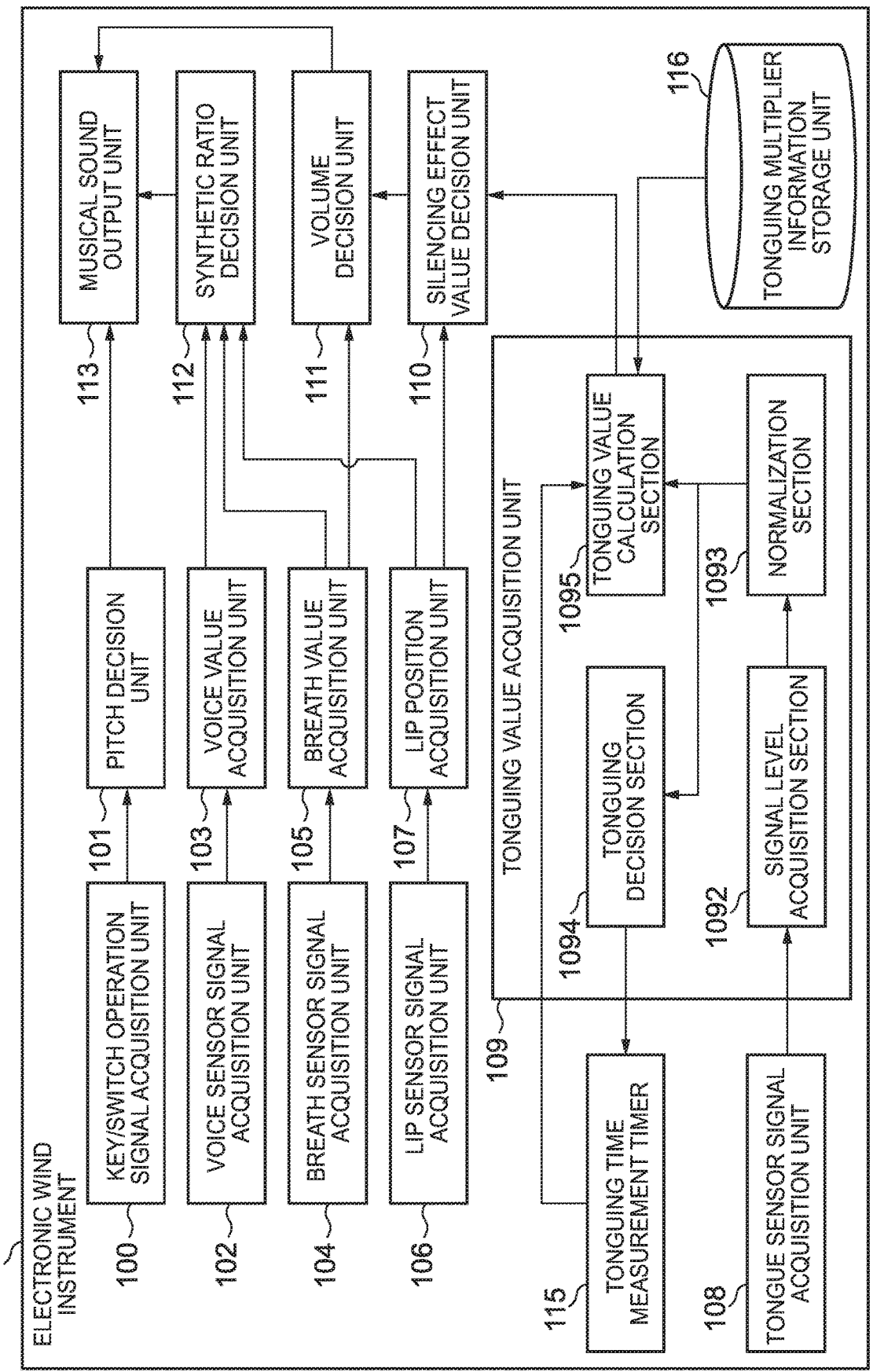
FIG. 13 is a diagram illustrating one example of a functional configuration of an electronic wind instrument according to a second embodiment of the present invention.

As illustrated in FIG. 13, the electronic wind instrument 1 according to the second embodiment does not include the tonguing value transition information storage unit 114 that the electronic wind instrument 1 according to the first embodiment includes and, instead, includes a tonguing time measurement timer 115 and a tonguing multiplier information storage unit 116 differently from the electronic wind instrument 1 according to the first embodiment. In addition, the tonguing value acquisition unit 109 that the electronic wind instrument 1 according to the second embodiment includes does not have the special signal processing section 1091 that the tonguing value acquisition unit 109 which is included in the electronic wind instrument 1 according to the first embodiment has and, instead, has a tonguing decision section 1094 and a tonguing value calculation section 1095 differently from the tonguing value acquisition unit 109 in the electronic wind instrument 1 according to the first embodiment.

The tonguing time measurement timer 115 is realized by the RAM 9. Specifically, the tonguing time measurement timer 115 is constructed in the storage area of the RAM 9. The tonguing multiplier information storage unit 116 is realized by the ROM 8. Specifically, the tonguing multiplier information storage unit 116 is constructed in the storage area of the ROM 8. The tonguing decision section 1094 and the tonguing value calculation section 1095 are realized by the CPU 7. Specifically, the CPU 7 controls the operation of the electronic wind instrument 1 by executing the control program which is stored in the ROM 8 and thereby functions as the tonguing decision section 1094 and the tonguing value calculation section 1095.

The tonguing decision section 1094 decides whether the tonguing concerned is done depending on a magnitude relation between the level of the tongue sensor signal which indicates the magnitude of the tongue sensor signal which is acquired by the tongue sensor signal acquisition unit 108 and is normalized by the normalization section 1093 and a tonguing threshold value which is set in advance. Specifically, in a case where the level of the tongue sensor signal which is normalized by the normalization section 1093 is higher than the tonguing threshold value, the tonguing decision section 1094 decides that the tonguing concerned is being done. On the other hand, in a case where the level of the tongue sensor signal which is normalized by the normalization section 1093 is lower than the tonguing threshold value, the tonguing decision section 1094 decides that no tonguing is done.

Each correlation between the kind of music playing and strength of the music playing operation of bringing the tongue into contact with the reed 4 in a case where each of the usual music playing and two kinds of tonguing-dependent music playing is performed by using the saxophone is experimentally obtained and thereby the tonguing threshold value is set in advance in accordance with the obtained correlations. Incidentally, the above-mentioned method of setting the tonguing threshold value is merely one example and the tonguing threshold value may be set by any optional method.

The tonguing time measurement timer 115 measures the tonguing time in accordance with a result of decision by the tonging decision section 1094. Specifically, the tonguing time measurement timer 115 measures the tonguing time by measuring a time which is taken from when the tonguing decision section 1094 decides that the tonguing concerned is done to when the tonguing decision section 1094 decides that no tonguing is done. The tonguing time measurement timer 115 is one example of a tonguing time measurement unit.

The tonguing multiplier information storage unit 116 stores tonguing multiplier information which indicates a correspondence relation between the tonguing time and the tonguing multiplier. Details of the tonguing multiplier information will be described later.

The tonguing value calculation section 1095 decides the tonguing multiplier which depends on the tonguing time which is measured by the tonguing time measurement timer 115 in accordance with the tonguing multiplier information which is stored in the tonguing multiplier information storage unit 116. The tonguing value calculation section 1095 calculates the tonguing value by multiplying the level of the tongue sensor signal which is normalized by the normalization section 1093 by the decided tonguing multiplier which depends on the tonguing time which is measured by the tonguing time measurement timer 115. The tonguing value acquisition unit 109 acquires the tonguing value which depends on the tonguing time with such a configuration.

In the following, tonguing value acquisition by the tonguing value acquisition unit 109 will be described with reference to FIG. 14A to FIG. 14C.

Figure 14A:
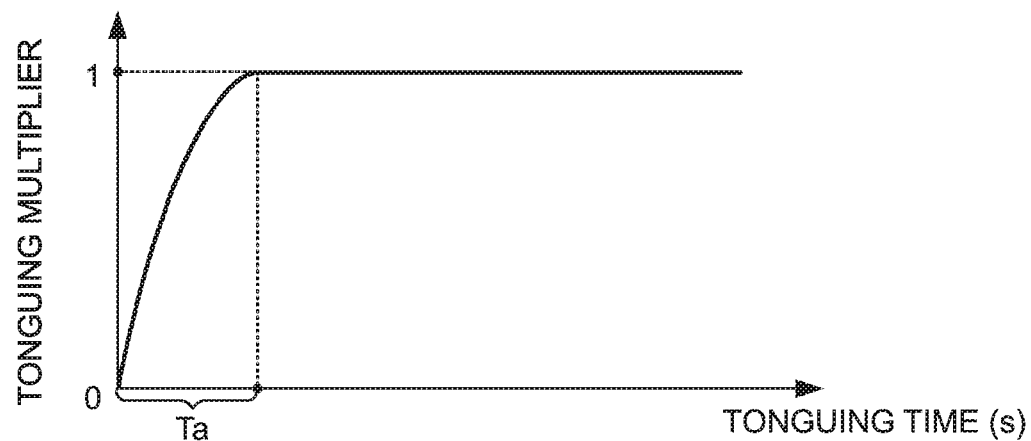
FIG. 14A is a diagram illustrating a configuration example of tonguing multiplier information.

As illustrated in FIG. 14A, the tonguing multiplier information is configured such that in a case where the tonguing time is longer than a first standard time Ta which is set in advance, the tonguing multiplier is decided to 1, in a case where the tonguing time is shorter than the first standard time Ta, the tonguing multiplier is decided to a value which is smaller than 1 and is decided to a larger value as the tonguing time becomes longer.

The tonguing multiplier information is generated by the external information processing device by experimentally obtaining a correlation between the tonguing time and the volume of the musical sound in a case where the tonguing concerned is done by using the saxophone and setting the correspondence relation between the tonguing time and the tonguing multiplier in accordance with the obtained correlation, then is fetched into the electronic wind instrument 1 and is stored in advance in the ROM 8. Incidentally, the above-mentioned tonguing multiplier information generation method is merely one example and it is possible to generate the tonguing multiplier information by any optional method.

Figure 14B:
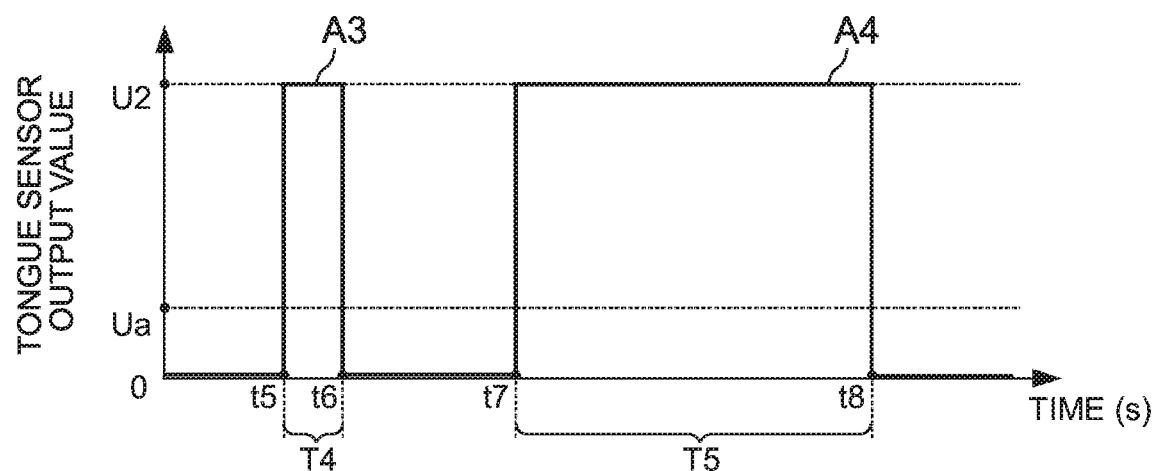
FIG. 14B is a diagram illustrating one example of a waveform of the tongue sensor signal.

In the following, description will be made by giving a case where the player does the legato tonguing one time and then does the usual tonguing one time by using the electronic wind instrument 1 and the tongue sensor 45 outputs a tongue sensor signal which has a signal waveform which is illustrated in FIG. 14B in response to the legato tonguing and the usual tonguing by way of example.

The tongue sensor signal which is illustrated in FIG. 14B includes a third signal waveform A3 and a fourth signal waveform A4 as signal waveforms. In the following, description will be made by giving a case where a maximum value of the output value of the tongue sensor 45 in the third waveform A3 and the fourth waveform A4 is a second value U2 by way of example.

The third signal waveform A3 is the signal waveform of the tongue sensor signal which is output in response to the legato tonguing. That is, a time t5 at which the third signal waveform A3 rises is the time at which the player's tongue is brought into contact with the reed 41 and the legato tonguing is started. A time t6 at which the third signal waveform A3 falls is the time at which the player's tongue is separated from the reed 41 and the legato tonguing is terminated. A fourth time T4 from the time t5 to the time t6 is the time period for which the legato tonguing is being done and the player's tongue is in contact with the reed 41. In the third signal waveform A3, the output value of the tongue sensor 45 is the second value U2 from the time t5 to the time t6.

The fourth signal waveform A4 is the signal waveform of the tongue sensor signal which is output in response to the usual tonguing. That is, a time t7 at which the fourth signal waveform A4 rises is the time at which the player's tongue is brought into contact with the reed 41 and the usual tonguing is started. A time t8 at which the fourth signal waveform A4 falls is the time at which the player's tongue is separated from the reed 41 and the usual tonguing is terminated. A fifth time T5 from the time t7 to the time t8 is the time period for which the usual tonguing is being done and the player's tongue is in contact with the reed 41. In the fourth signal waveform A4, the output value of the tongue sensor 45 is the second value U2 from the time t7 to the time t8.

In the following, description will be made by giving a case where the second value U2 is larger than a tonguing threshold value Ua by way of example. In this case, the tonguing time measurement timer 115 measures a time which has elapsed from the time t5 as the tonguing time for the legato tonguing in the third signal waveform A3. In addition, the tonguing time measurement timer 115 measures a time which has elapsed from the time t7 as the tonguing time for the usual tonguing in the fourth signal waveform A4.

In the following, description will be made by giving a case where the tonguing value calculation section 1095 decides the tonguing multiplier which depends on the tonguing time which is measured by the tonguing time measurement timer 115 in accordance with the tonguing multiplier information which is illustrated in FIG. 14A and calculates the tonguing value by multiplying the level of the tongue sensor signal which indicates the magnitude of the tongue sensor signal which is illustrated in FIG. 14B and is normalized by the normalization section 1063 by the decided tonguing multiplier by way of example. FIG. 14C illustrates one example of time-dependent transitions of the tonguing value which is acquired by the tonguing value acquisition unit 109 in this case.

In the following, description will be made by giving a case where the tonguing value becomes 1 when the second value U2 is normalized to a value in the range from 0 to 1 by way of example. In addition, in the following, description will be made by giving a case where the fourth time T4 is shorter than the first standard time Ta and the fifth time T5 is longer than the first standard time Ta by way of example.

Figure 14C:
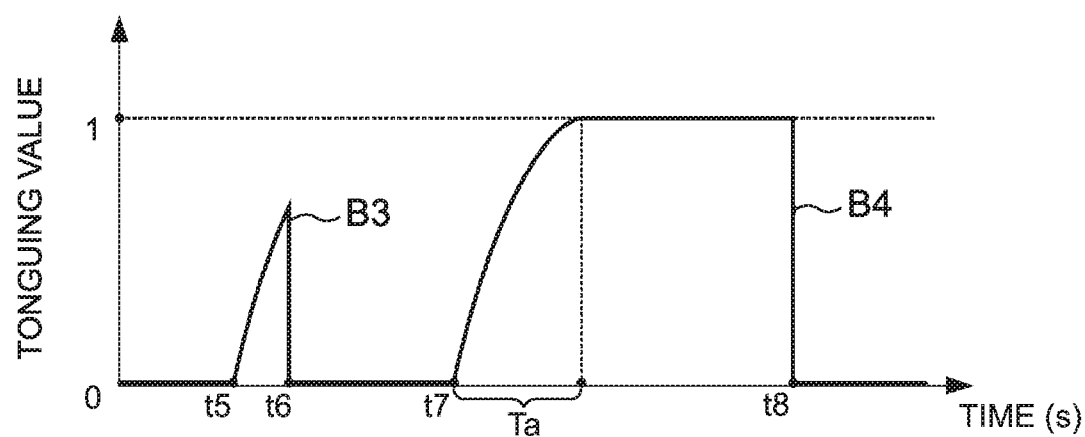
FIG. 14C is a diagram illustrating one example of time-dependent transition of the tonguing value.

As illustrated in FIG. 14C, the tonguing value acquisition unit 109 calculates the tonguing value by multiplying the level of the tongue sensor signal which is normalized by the normalization section 1093 by the tonguing multiplier which depends on the tonguing time which is measured by the tonguing time measurement timer 115 and thereby acquires the tonguing value which depends on the tonguing time.

Specifically, a third transition waveform B3 and a fourth transition waveform B4 are included as waveforms which indicate transitions of the tonguing value illustrated in FIG. 14C. The third transition waveform B3 indicates the transition of the tonguing value which is acquired depending on the third signal waveform A3. The fourth transition waveform B4 indicates the transition of the tonguing value which is acquired depending on the fourth signal waveform A4.

In a case where, in the third signal waveform A3, the output value of the tongue sensor 45 is the second value U2 from the time t5 to the time t6 and the tonguing time is shorter than the first standard time Ta in the tonguing multiplier information, the tonguing multiplier has a value which is smaller than 1 and becomes larger as the tonguing time becomes longer. In correspondence with this situation, in the third transition waveform B3, the tonguing value is smaller than 1 and becomes larger as the time which has elapsed from the time t5, that is, the tonguing time which is measured by the tonguing time measurement timer 115 becomes longer.

In a case where, in the fourth signal waveform A4, the output value of the tongue sensor 45 is the second value U2 from the time t7 to the time t8 and the tonguing time is longer than the first standard time Ta in the tonguing multiplier information, the tonguing multiplier is decided to 1. In correspondence with this situation, in a case where, in the fourth transition waveform B4, in a case where a time which has elapsed from the time t7, that is, the tonguing time which is measured by the tonguing time measurement timer 115 is longer than the first standard time Ta, the tonguing value is 1. In addition, in a case where, in the fourth signal waveform A4, the output value of the tongue sensor 45 is the second value U2 from the time t7 to the time t8 and the tonguing time is shorter than the first standard time Ta in the tonguing multiplier information, the tonguing multiplier is decided to a value which is smaller than 1 and is decided to a larger value as the tonguing time becomes longer. In correspondence with this situation, in a case where, in the fourth transition waveform B4, a time which has elapsed from the time t7, that is, the tonguing time which is measured by the tonguing time measurement timer 115 is shorter than the first standard time Ta, the tonguing value is smaller than 1 and becomes larger as the time which has elapsed from the time t7 becomes longer.

The first standard time Ta is one example of the special time and 1 is one example of the special value.

As described above, the larger the tonguing value is, the larger the silencing effect value is, and the larger the silencing effect value is, the higher the volume reduction degree is. Accordingly, in the example illustrated in FIG. 14C, in a case where the tonguing time is shorter than the first standard time Ta, the volume reduction degree becomes lower than the volume reduction degree which is attained in a case where the tonguing time is longer than the first standard time Ta and the longer the tonguing time is, the higher the volume reduction degree is.

Accordingly, in a case where the tonguing concerned is done by using the electronic wind instrument 1, it becomes possible for the player to reproduce the musical performance expression which is given in a case where the legato tonguing is done by using the saxophone by performing a music playing operation of adjusting the time period for which the tongue is in contact with the reed 41 to become shorter than the first standard time Ta.

That is, in music playing using the electronic wind instrument 1, it becomes possible to reproduce the musical performance expression which is given in a case where the legato tonguing is done by using the saxophone by the simple music playing operation.

In addition, in a case where the tonguing concerned is done by using the electronic wind instrument 1, it becomes possible for the player to reproduce the musical performance expression which is given in a case where the usual tonguing is done by using the saxophone by performing a music playing operation of adjusting the time for which the tongue is in contact with the reed 41 to become longer than the first standard time Ta. That is, in music playing using the electronic wind instrument 1, it becomes possible to reproduce the musical performance expression which is given in a case where the usual tonguing is done by using the saxophone by the simple music playing operation.

Figure 11:
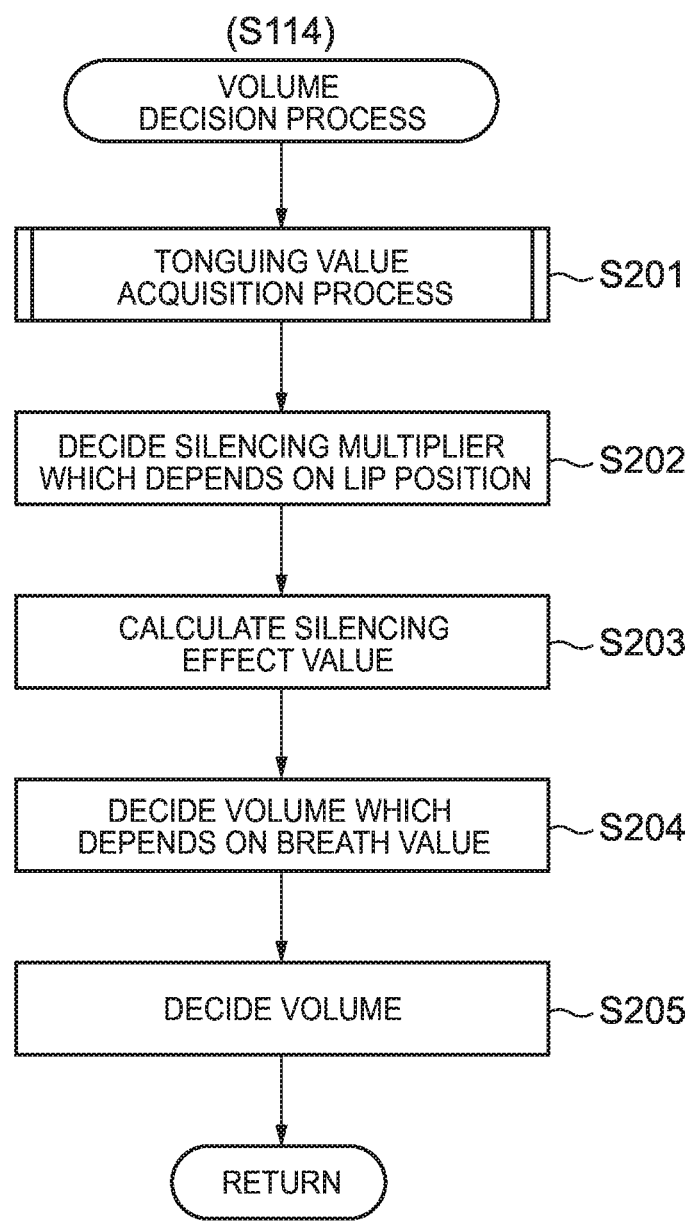
FIG. 11 is a flowchart illustrating one example of a volume decision process that the electronic wind instrument according to the first embodiment of the present invention executes.

The electronic wind instrument 1 which includes the above-mentioned physical and functional configurations executes processing and process which are almost the same as the main signal processing which is illustrated in the flowchart in FIG. 10 and the volume decision process which is illustrated in the flowchart in FIG. 11 that the electronic wind instrument 1 according to the first embodiment executes. However, the electronic wind instrument 1 according to the second embodiment executes a tonguing value acquisition process which is illustrated in a flowchart in FIG. 15 in place of the tonguing value acquisition process which is illustrated in the flowchart in FIG. 12 in step S201 of the volume decision process which is illustrated in the flowchart in FIG. 11. In the following, the tonguing value acquisition process that the electronic wind instrument 1 according to the second embodiment executes will be described with reference to a flowchart in FIG. 15.

Figure 15:
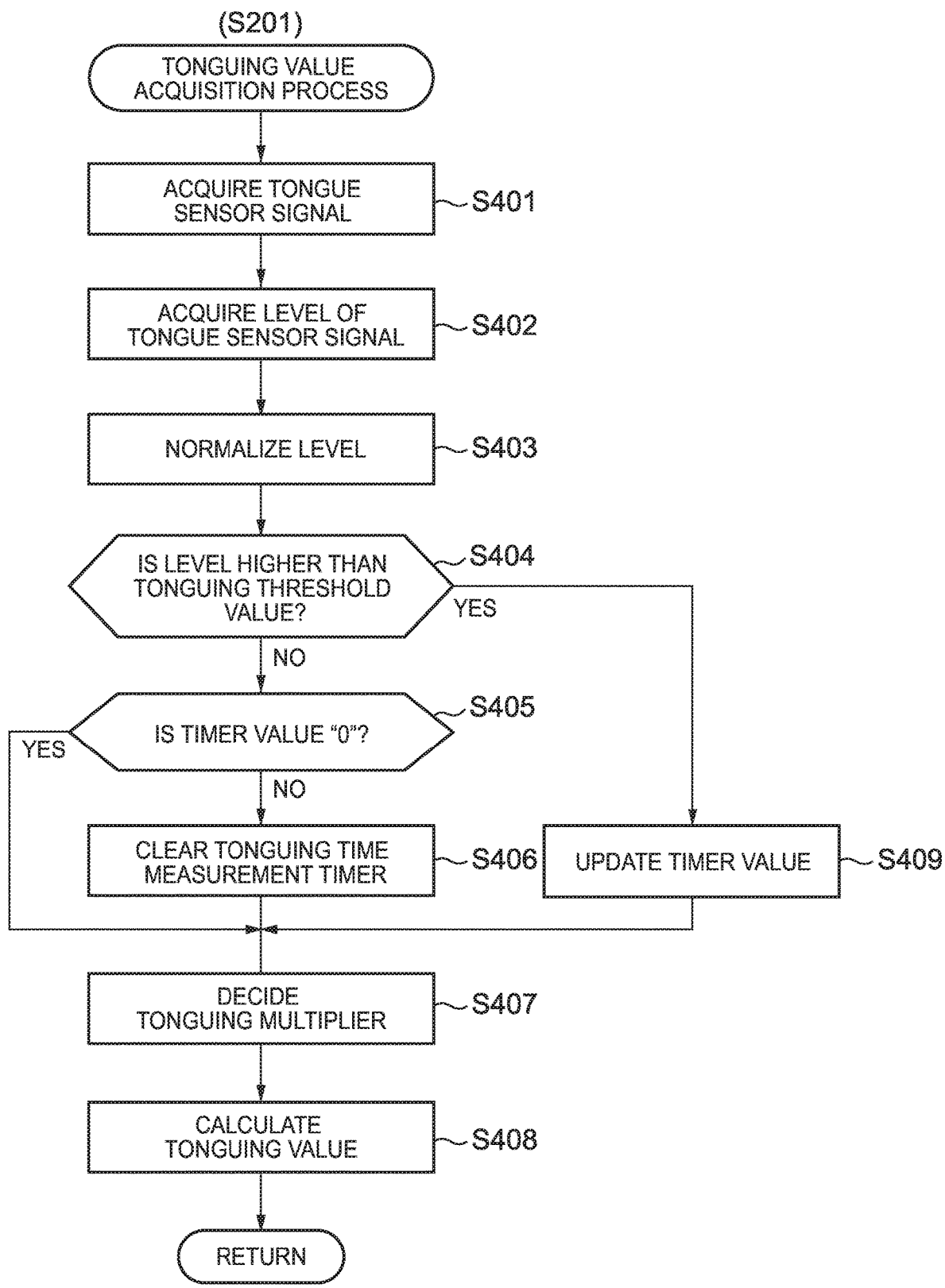
FIG. 15 is a flowchart illustrating one example of a tonguing value acquisition process that the electronic wind instrument according to the second embodiment of the present invention executes.

Prior to execution of the tonguing value acquisition process which is illustrated in the flowchart in FIG. 15, the tonguing multiplier information is fetched into the electronic wind instrument 1 and is stored in advance in the ROM 8.

In a case where execution of the tonguing value acquisition process which is illustrated in the flowchart in FIG. 15 is started, first, the tonguing sensor signal acquisition unit 108 acquires the tongue sensor signal from the tongue sensor 45 (step S401). After execution of the process in step S401, the signal level acquisition section 1092 acquires the level of the tongue sensor signal which is acquired in step S401 (step S402). After execution of the process in step S402, the normalization section 1093 normalizes the level of the tongue sensor signal which is acquired in step S402 to a value in the range from 0 to 1 (step S403).

After execution of the process in step S403, the tonguing decision section 1094 decides whether the level of the tongue sensor signal which is normalized in step S403 is higher than the tonguing threshold value Ua and thereby decides whether the tonguing concerned is being done (step S404).

In a case where it is decided that the level of the tongue sensor signal which is normalized in step S403 is lower than the tonguing threshold value Ua (step S404; No), the CPU 7 decides whether a timer value which is a storage value in the tonguing time measurement timer 115 is 0 (step S405).

In a case where it is decided that the timer value is 0 (step S405; Yes), the process shifts to step S407. On the other hand, in a case where it is decided that the timer value is not 0 (step S405; No), the CPU 7 clears the tonguing time measurement timer 115 and sets the timer value to 0 which is an initial value (step S406) and the process shifts to step S407.

In step S404, in a case where it is decided that the level of the tongue sensor signal which is normalized in step S403 is higher than the tonguing threshold value Ua (step S404; Yes), the CPU 7 updates the timer value by adding 1 to the time value and the process shifts to step S407.

The tonguing time is measured by the tonguing time measurement timer 115 by executing the processes in step S404 to step S406 and step S409.

In step S407, the tonguing value calculation section 1095 decides the tonguing multiplier which depends on the tonguing time that a current timer value indicates in accordance with the tonguing multiplier information which is stored in the tonguing multiplier information storage unit 116 (step S407).

After execution of the process in step S407, the tonguing value calculation section 1095 calculates the tonguing value by multiplying the level of the tongue sensor signal which is normalized in step S403 by the tonguing multiplier which is decided in step S407 (step S408) and thereby execution of the tonguing value acquisition process is terminated.

As described above, the electronic wind instrument 1 according to the second embodiment calculates the tonguing value by multiplying the level of the tongue sensor signal which indicates the magnitude of the tongue sensor signal which is acquired by the tongue sensor signal acquisition unit 108 and is normalized by the normalization section 1093 by the tonguing multiplier which depends on the tonguing time which is measured by the tonguing time measurement timer 115 and thereby acquires the tonguing value which depends on the tonguing time. In music playing using the electronic wind instrument 1, it becomes possible to reproduce the musical performance expression which is given in a case where the legato tonguing is done by using the saxophone which is the natural woodwind instrument by the simple music playing operation with such a configuration.

Third Embodiment

In the second embodiment, description is made on the presumption that the electronic wind instrument 1 is configured to measure the tonguing time, to calculate the tonguing value by multiplying the normalized level of the tongue sensor signal which indicates the magnitude of the tongue sensor signal by the tonguing multiplier which depends the measured tonguing time and thereby to acquire the tonguing value which depends on the tonguing time. However, this configuration is merely one example and it is possible for the electronic wind instrument 1 to acquire the tonguing value which depends on the tonguing time by any optional method depending on the measured tonguing time. In the following, the electronic wind instrument 1 which is configured to store in advance tonguing value decision information which indicates a correspondence relation between the tonguing time and the tonguing value, to acquire the tonguing value which depends on the measured tonguing time in accordance with the tonguing value decision information and thereby to acquire the tonguing value which depends on the tonguing time will be described.

Although physical and functional configurations that the electronic wind instrument according to the third embodiment includes are almost the same as the physical and functional configurations that the electronic wind instrument 1 according to the second embodiment includes, the former is partially different from the latter. In the following, the physical and functional configurations that the electronic wind instrument 1 according to the third embodiment includes will be described with a focus on differences in the physical and functional configurations that the electronic wind instrument 1 according to the second embodiment includes.

Figure 16:
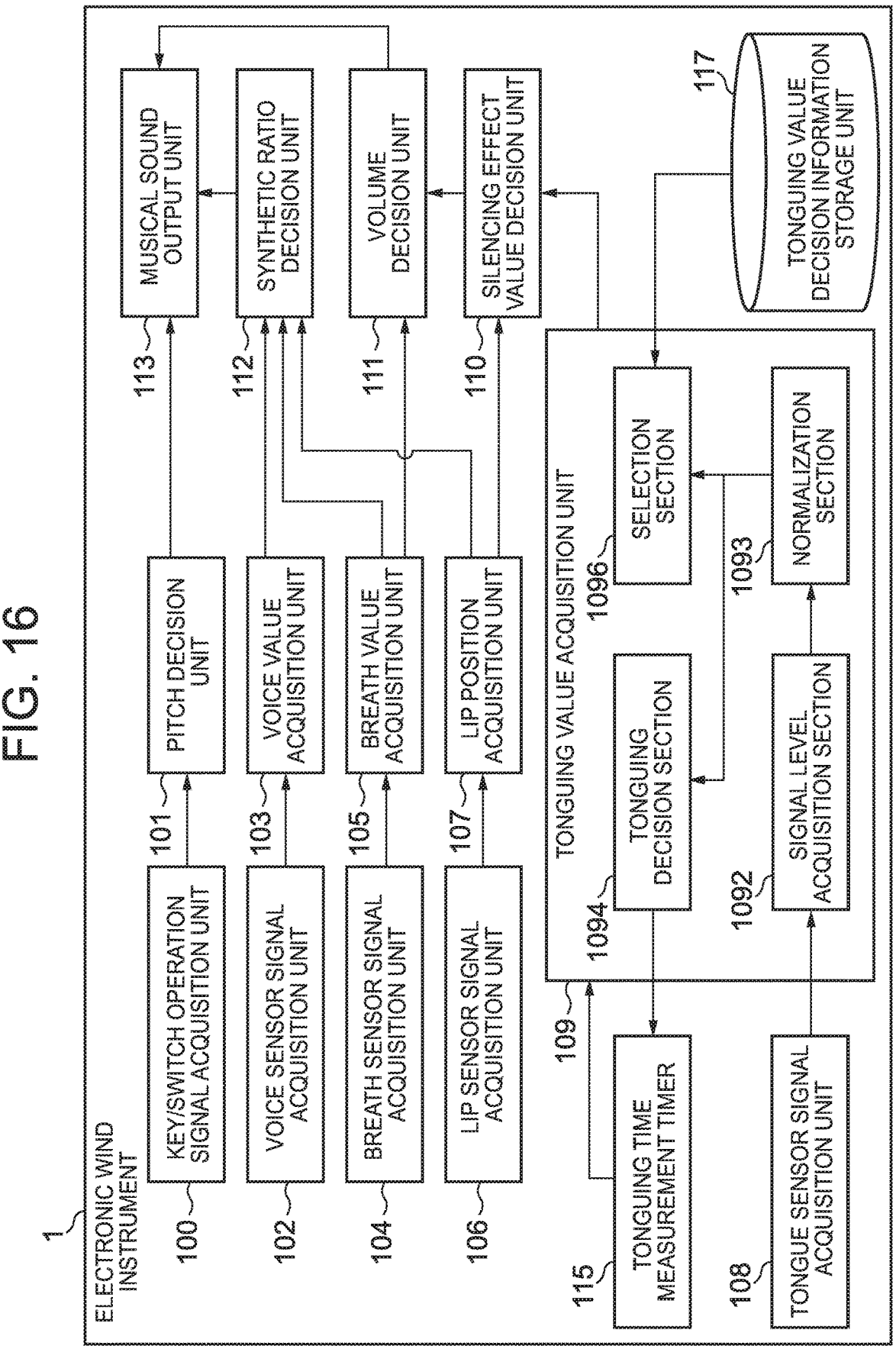
FIG. 16 is a diagram illustrating one example of a functional configuration of an electronic wind instrument according to a third embodiment of the present invention.

As illustrated in FIG. 16, the electronic wind instrument 1 according to the third embodiment does not include the tonguing multiplier information storage unit 116 which is included in the electronic wind instrument 1 according to the second embodiment includes and, instead, includes a tonguing value decision information storage unit 117 differently from the electronic wind instrument 1 according to the second embodiment. In addition, the tonguing value acquisition unit 109 which is included in the electronic wind instrument 1 according to the third embodiment includes does not have the tonguing value calculation section 1095 that the tonguing value acquisition unit 109 which is included in the electronic wind instrument 1 according to the second embodiment has and, instead, has a selection section 1096 differently from the tonguing value acquisition unit 109 that the electronic wind instrument 1 according to the second embodiment includes.

The tonguing value decision information storage unit 117 is realized by the ROM 8. Specifically, the tonguing value decision information storage unit 117 is constructed in the storage area of the ROM 8. The selection section 1096 is realized by the CPU 7. Specifically, the CPU 7 controls the operation of the electronic wind instrument 1 by executing the control program which is stored in the ROM 8 and thereby functions as the selection section 1096.

The tonguing value decision information storage unit 117 stores the tonguing value decision information which indicates the correspondence relation between the tonguing time and the tonguing value. Specifically, the tonguing value decision information storage unit 117 stores first tonguing value decision information and second tonguing value decision information as the tonguing value decision information. Details of the first tonguing value decision information and the second tonguing value decision information will be described later.

The selection section 1096 selects either the first tonguing value decision information or the second tonguing value decision information depending on the level of the tongue sensor signal which indicates the magnitude of the tongue sensor signal which is acquired by the tongue sensor signal acquisition unit 108 and is normalized by the normalization section 1093. Specifically, the selection section 1096 selects the first tonguing value decision information in a case where the level of the tongue sensor signal which is normalized by the normalization section 1093 is higher than a selection threshold value which is set in advance and selects the second tonguing value decision information in a case where the normalized level of the tongue sensor signal is lower than the selection threshold value. Details of the selection threshold value will be described later.

The tonguing value acquisition unit 109 acquires the tonguing value which depends on the tonguing time which is measured by the tonguing time measurement timer 115 in accordance with the first or second tonguing value decision information which is selected by the selection section 1096. The tonguing value acquisition unit 109 acquires the tonguing value which depends on the tonguing time with such a configuration.

In the following, acquisition of the tonguing value by the tonguing value acquisition unit 109 will be described with reference to FIG. 17A to FIG. 17D.

Figure 17A:
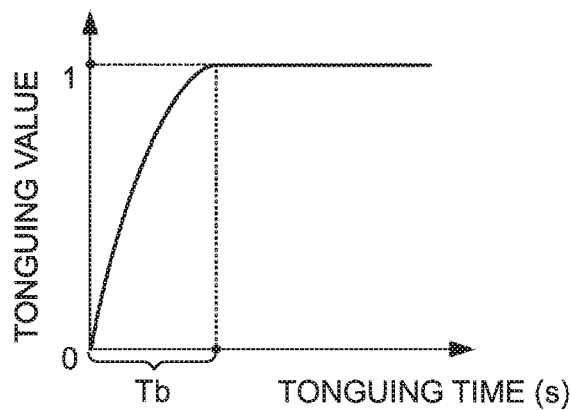
FIG. 17A is a diagram illustrating a configuration example of first tonguing value decision information.

The first tonguing value decision information is configured such that in a case where the tonguing time is longer than a second standard time Tb which is set in advance, the tonguing value is decided to 1, and in a case where the tonging time is shorter than the second standard time Tb, the tonguing value is decided to a value which is smaller than 1 and is decided to a larger value as the tonguing time becomes longer as illustrated in FIG. 17A.

Figure 17B:
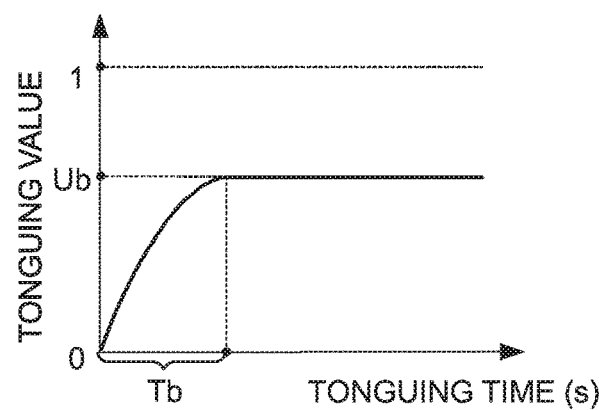
FIG. 17B is a diagram illustrating a configuration example of second tonguing value decision information.

The second tonguing value decision information is configured such that in a case where the tonguing time is longer than the second standard time Tb, the tonguing value is decided to a first standard value Ub which is smaller than 1, and in a case where the tonguing time is shorter than the second standard time Tb, the tonguing value is decided to a value which is smaller than the first standard value Ub and is decided to a larger value as the tonguing time becomes longer as illustrated in FIG. 17B.

In a case where the tonguing times are the same as each other, when the first tonguing value decision information is selected by the selection section 1096, a value which is larger than the tonguing value obtained when the second tonguing value decision information is selected by the selection section 1096 is acquired as the tonguing value with such a configuration. For example, in a case where the first tonguing value decision information is selected by the selection section 1096, when the tonguing time which is measured by the tonguing time measurement timer 115 is the second standard time Tb, the tonguing value acquisition unit 109 acquires 1 as the tonguing value. On the other hand, in a case where the second tonguing time decision information is selected by the selection section 1096, when the tonguing time which is measured by the tonguing time measurement timer 115 is the second standard time Tb, the tonguing value acquisition unit 109 acquires the first standard value Ub which is smaller than 1 as the tonguing value. The second standard time Tb is one example of a reference time. In addition, 1 is one example of a first reference value and the first standard value Ub is one example of a second reference value.

The tonguing value acquisition unit 109 acquires the tonguing value in accordance with the first or second tonguing value decision information which is selected by the selection section 1096 depending on the level of the tongue sensor signal which indicates the magnitude of the tongue sensor signal and is normalized by the normalization section 1093 and thereby acquires the tonguing value which depends on the magnitude of the tongue sensor signal.

Incidentally, a correlation between the strength of the music playing operation of bringing the tongue into contact with the reed 41 and the volume of the musical sound in a case where the tonguing concerned is done by using the saxophone is experimentally obtained and thereby the selection threshold value is set depending on the obtained correlation. Incidentally, the above-mentioned selection threshold value setting method is merely one example and it is possible to set the selection threshold value by any optional method.

The first tonguing value decision information and the second tonguing value decision information are generated by the external information processing device by experimentally obtaining a correlation among the strength of the music playing operation of bringing the tongue into contact with the reed 41, the tonguing time and the volume of the musical sound in a case where the tonguing concerned is done by using the saxophone and setting the correspondence relation between the tonguing time and the tonguing value in accordance with the obtained correlation, are then fetched into the electronic wind instrument 1 and are stored in the ROM 8 in advance.

Figure 17C:
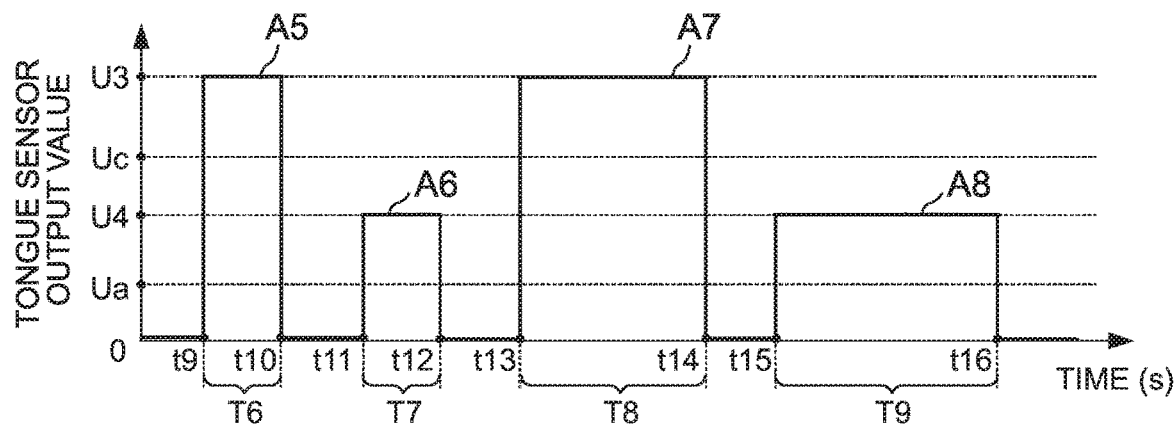
FIG. 17C is a diagram illustrating one example of a waveform of the tongue sensor signal.

In the following, description will be made by giving a case where the player does the legato tonguing two times and then does the usual tonguing two times by using the electronic wind instrument 1 and then the tongue sensor 45 outputs a tongue sensor signal which has signal waveforms which are illustrated in FIG. 17C in response to the music playing operation by way of example.

A fifth signal waveform A5, a sixth signal waveform A6, a seventh signal waveform A7 and an eighth signal waveform A8 are included as the signal waveforms of the tongue sensor signal which is illustrated in FIG. 17C. In the following, description will be made by giving a case where a maximum value of the output value of the tongue sensor 45 in the fifth signal waveform A5 and the seventh signal waveform A7 is a third value U3 and a maximum value of the output value of the tongue sensor 45 in the sixth signal waveform A6 and the eighth signal waveform A8 is a fourth value U4 by way of example.

The fifth signal waveform A5 is the signal waveform of the tongue sensor signal which is output in response to the first-time legato tonguing. That is, a time t9 at which the fifth signal waveform A5 rises is the time at which the player's tongue is brought into contact with the reed 41 and the first-time legato tonguing is started. A time t10 at which the fifth signal waveform A5 falls is the time at which the player's tongue is separated from the reed 41 and the first-time legato tonguing is terminated. A sixth time T6 from the time t9 to the time t10 is the time period for which the first-time legato tonguing is being done and the player's tongue is in contact with the reed 41. In the fifth signal waveform A5, the output value of the tongue sensor 45 is the third value U3 from the time t9 to the time t10.

The sixth signal waveform A6 is the signal waveform of the tongue sensor signal which is output in response to the second-time legato tonguing. That is, a time t11 at which the sixth signal waveform A6 rises is the time at which the player's tongue is brought into contact with the reed 41 and the second-time legato tonguing is started. A time t12 at which the sixth signal waveform A6 falls is the time at which the player's tongue is separated from the reed 41 and the second-time legato tonguing is terminated. A seventh time T7 from the time t11 to the time t12 is the time period for which the second-time legato tonguing is being done and the player's tongue is in contact with the reed 41. In the sixth signal waveform A6, the output value of the tongue sensor 45 is the fourth value U4 from the time t11 to the time t12.

The seventh signal waveform A7 is the signal waveform of the tongue sensor signal which is output in response to the first-time usual tonguing. That is, a time t13 at which the seventh signal waveform A7 rises is the time at which the player's tongue is brought into contact with the reed 41 and the first-time usual tonguing is started. A time t14 at which the seventh signal waveform A7 falls is the time at which the player's tongue is separated from the reed 41 and the first-time usual tonguing is terminated. An eighth time T8 from the time t13 to the time t14 is the time period for which the first-time usual tonguing is being done and the player's tongue is in contact with the reed 41. In the seventh signal waveform A7, the output value of the tongue sensor 45 is the third value U3 from the time t13 to the time t14.

The eighth signal waveform A8 is the signal waveform of the tongue sensor signal which is output in response to the second-time usual tonguing. That is, a time t15 at which the eighth signal waveform A8 rises is the time at which the player's tongue is brought into contact with the reed 41 and the second-time usual tonguing is started. A time t16 at which the eighth signal waveform A8 falls is the time at which the player's tongue is separated from the reed 41 and the second-time usual tonguing is terminated. A ninth time T9 from the time t15 to the time t16 is the time period for which the second-time usual tonguing is being done and the player's tongue is in contact with the reed 41. In the eighth signal waveform A8, the output value of the tongue sensor 45 is the fourth value U4 from the time t15 to the time t16.

In the following, description will be made by giving a case where the third value U3 and the fourth value U4 are larger than the tonguing threshold value Ua by way of example. In this case, the tonguing time measurement timer 115 measures the time which has elapsed from the time t9 in the fifth signal waveform A5 as the tonguing time of the first-time legato tonguing, measures the time which has elapsed from the time t11 in the sixth signal waveform A6 as the tonguing time of the second-time legato tonguing, measures the time which has elapsed from the time t13 in the seventh signal waveform A7 as the tonguing time of the first-time usual tonguing, and measures the time which has elapsed from the time t15 in the eighth signal waveform A8 as the tonguing time of the second-time usual tonguing.

In the following, description will be made by giving a case where the selection section 1096 selects either the first tonguing value decision information or the second tonguing value decision information depending on the level of the tongue sensor signal which indicates the magnitude of the tongue sensor signal illustrated in FIG. 17C and is normalized by the normalization section 1093 by way of example.

Specifically, in the following, description will be made by giving a case where the third value U3 is larger than a selection threshold value Uc and the fourth value U4 is smaller than the selection threshold value Uc by way of example. In this case, the selection section 1096 selects the first tonguing value decision information as the tonguing value decision information which depends on the fifth signal waveform A5 and the seventh signal waveform A7. On the other hand, the selection section 1096 selects the second tonguing value decision information as the tonguing value decision information which depends on the sixth signal waveform A6 and the eighth signal waveform A8.

Figure 17D:
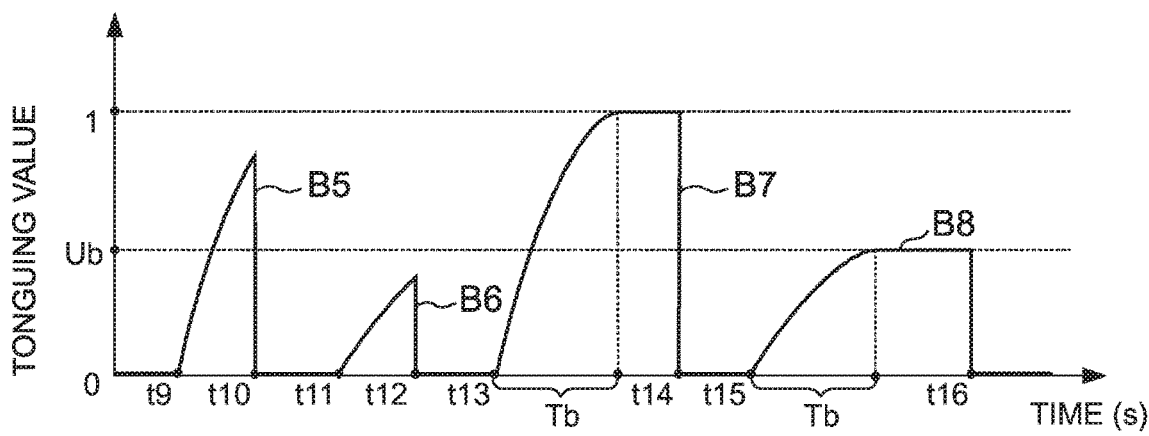
FIG. 17D is a diagram illustrating one example of time-dependent transition of the tonguing value.

In the following, description will be made by giving a case where the tonguing value acquisition unit 109 acquires the tonguing value which depends on the tonguing time which is measured by the tonguing time measurement timer 115 in accordance with the first or second tonguing value decision information which is selected by the selection section 1096 by way of example. FIG. 17D illustrates one example of time-dependent transitions of the tonguing value which is acquired by the tonguing value acquisition unit 109 in the above case.

A fifth transition waveform B5, a sixth transition waveform B6, a seventh transition waveform B7 and an eighth transition waveform B8 are included as waveforms which indicate transitions of the tonguing value which is illustrated in FIG. 17D. The fifth transition waveform B5 indicates the transition of the tonguing value which is acquired depending on the fifth signal waveform A5. The sixth transition waveform B6 indicates the transition of the tonguing value which is acquired depending on the sixth signal waveform A6. The seventh transition waveform B7 indicates the transition of the tonguing value which is acquired depending on the seventh signal waveform A7. The eighth transition waveform B8 indicates the transition of the tonguing value which is acquired depending on the eighth signal waveform A8.

In correspondence with a situation where the first tonguing value decision information is selected by the selection section 1096 as the tonguing value decision information which depends on the fifth signal waveform A5, in the fifth transition waveform B5, the tonguing value is smaller than 1 and becomes larger as the time which has elapsed from the time t9, that is, the tonguing time which is measured by the tonguing time measurement timer 115 becomes longer In correspondence with a situation where the second tonguing value decision information is selected by the selection section 1096 as the tonguing value decision information which depends on the sixth signal waveform A6, in the sixth transition waveform B6, the tonguing value is smaller than the first standard value Ub and becomes larger as the time which has elapsed from the time t11, that is, the tonguing time which is measured by the tonguing time measurement timer 115 becomes longer.

In correspondence with a situation where the first tonguing value decision information is selected by the selection section 1096 as the tonguing value decision information which depends on the seventh signal waveform A7, in the seventh transition waveform B7, in a case where the time which has elapsed from the time t13, that is, the tonguing time which is measured by the tonguing time measurement timer 115 is longer than the second standard time Tb, the tonguing value is 1. In addition, in the seventh transition waveform B7, in a case where the time which has elapsed from the time t13, that is, the tonguing time which is measured by the tonguing time measurement timer 115 is shorter than the second standard time Tb, the tonguing value is smaller than 1 and becomes larger as the time which has elapsed from the time t13 becomes longer.

The second standard time Tb is one example of the special time and 1 is one example of the special value.

In correspondence with a situation where the second tonguing value decision information is selected by the selection section 1096 as the tonguing value decision information which depends on the eighth signal waveform A8, in the eighth transition waveform B8, in a case where the time which has elapsed from the time t15, that is, the tonguing time which is measured by the tonguing time measurement timer 115 is longer than the second standard time Tb, the tonguing value is the first standard value Ub. In addition, in the eighth transition waveform B8, in a case where the time which has elapsed from the time t15, that is, the tonguing time which is measured by the tonguing time measurement timer 115 is shorter than the second standard time Tb, the tonguing value is smaller than the first standard value Ub and becomes larger as the time which has elapsed from the time t15 becomes longer.

The second standard time Tb is one example of the special time and the first standard value Ub is one example of the special value.

As described above, the larger the tonguing value is, the larger the silencing effect value is, and the larger the silencing effect value is, the higher the volume reduction degree is. Accordingly, in the example illustrated in FIG. 17D, in a case where the tonguing time is shorter than the second standard time Tb, the volume reduction degree is lower than the volume reduction degree which is obtained in a case where the tonguing time is longer than the second standard time Tb, and the longer the tonguing time is, the higher the volume reduction degree is.

Accordingly, in a case where the tonguing concerned is done by using the electronic wind instrument 1, it becomes possible for the player to reproduce the musical performance expression which is given in a case where the legato tonguing is done by using the saxophone by performing a music playing operation of adjusting the time for which the tongue is in contact with the reed 41 so as to become shorter than the second standard time Tb.

That is, in music playing using the electronic wind instrument 1, it becomes possible to reproduce the musical performance expression which is given in a case where the legato tonguing is done by using the saxophone by the simple music playing operation.

In addition, in a case where the player does the tonguing concerned by using the electronic wind instrument 1, it becomes possible for the player to reproduce the musical performance expression which is given in a case where the usual tonguing is done by using the saxophone by performing a music playing operation of adjusting the time for which the tongue is in contact with the reed 41 so as to become longer than the second standard time Tb. That is, in music playing using the electronic wind instrument 1, it becomes possible to reproduce the musical performance expression which is given in a case where the usual tonguing is done by using the saxophone by the simple music playing operation.

The electronic wind instrument 1 which includes the above-mentioned physical and functional configurations executes processing and process which are almost the same as the main control processing which is illustrated in the flowchart in FIG. 10 and the volume decision process which is illustrated in the flowchart in FIG. 11 that the electronic wind instrument 1 according to the first embodiment executes. However, the electronic wind instrument 1 according to the third embodiment executes a tonguing value acquisition process which is illustrated in a flowchart in FIG. 18 in place of the tonguing value acquisition process which is illustrated in the flowchart in FIG. 12 in step S201 of the volume decision process which is illustrated in the flowchart in FIG. 11. In the following, the tonguing value acquisition process that the electronic wind instrument 1 according to the third embodiment executes will be described with reference to FIG. 18.

Figure 18:
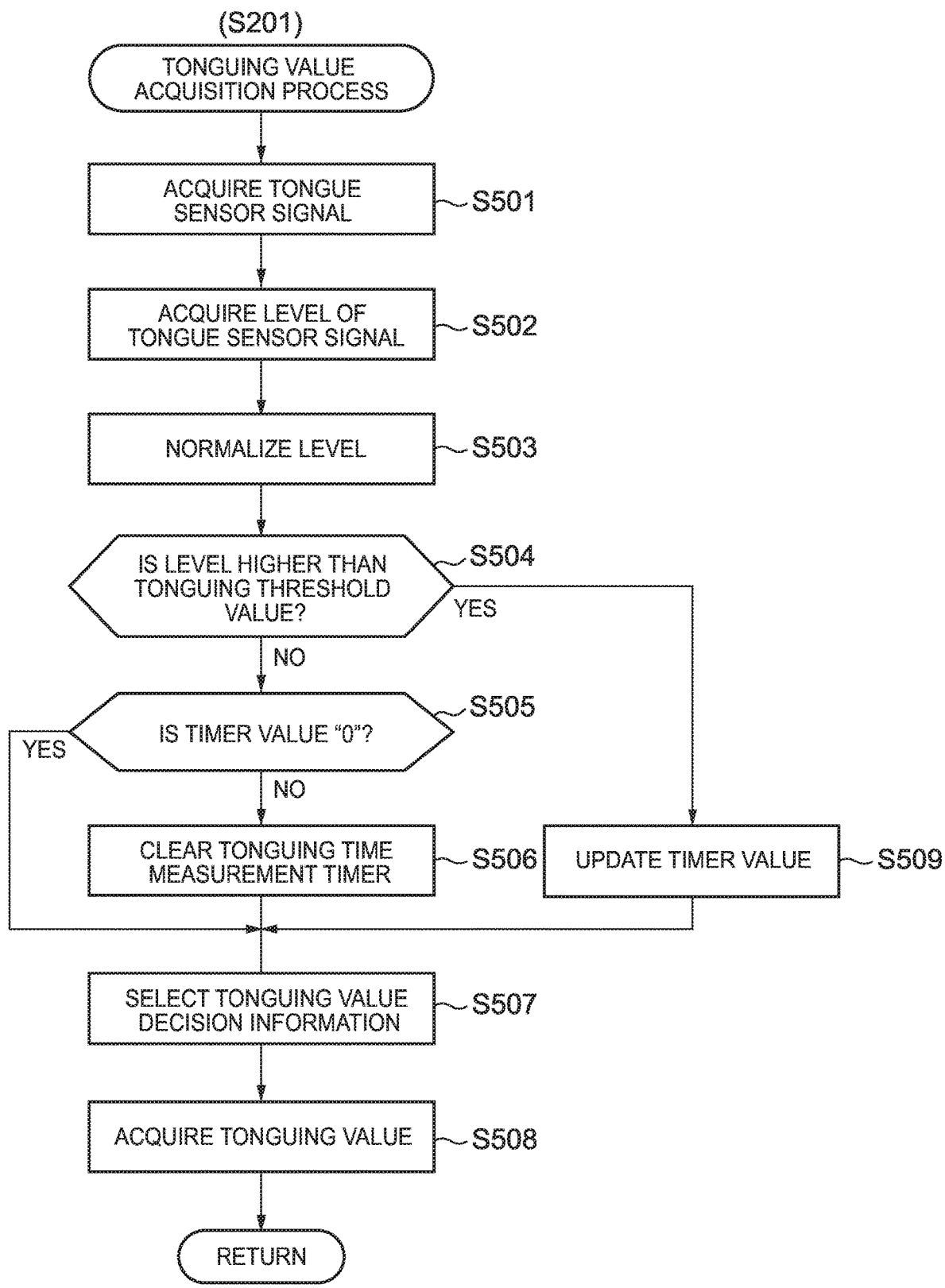
FIG. 18 is a flowchart illustrating one example of a tonguing value acquisition process that the electronic wind instrument according to the third embodiment of the present invention executes.

Prior to execution of the tonguing value acquisition process which is illustrated in the flowchart in FIG. 18, the first tonguing value decision information and the second tonguing value decision information are fetched into the electronic wind instrument 1 according to the third embodiment and is stored in advance in the ROM 8.

In a case where execution of the tonguing value acquisition process which is illustrated in the flowchart in FIG. 18 is started, first, the tongue sensor signal acquisition unit 108 acquires the tongue sensor signal from the tongue sensor 45 (step S501). After execution of the process in step S501, the signal level acquisition section 1092 acquires the level of the tongue sensor signal which is acquired in step S501 (step S502). After execution of the process in step S502, the normalization section 1093 normalizes the level of the tongue sensor signal which is acquired in step S502 to a value in the range from 0 to 1 (step S503).

After execution of the process in step S503, the tonguing decision section 1094 decides whether the level of the tongue sensor signal which is normalized in step S503 is higher than the tonguing threshold value Ua and thereby decides whether the tonguing concerned is being done (step S504).

In a case where it is decided that the level of the tongue sensor signal which is normalized in step S503 is lower than the tonguing threshold value Ua (step S504; No), the CPU 7 decides whether a timer value is 0 (step S505). In a case where it is decided that the timer value is 0 (step S505; Yes), the process shifts to step S507. On the other hand, in a case where it is decided that the timer value is not 0 (step S505; No), the CPU 7 clears the tonguing time measurement timer 115 and sets the timer value to 0 which is an initial value (step S506) and the process shifts to step S507.

In step S504, in a case where it is decided that the level of the tongue sensor signal which is normalized in step S503 is higher than the tonguing threshold value Ua (step S504; Yes), the CPU 7 updates the timer value by adding 1 to the timer value (step S509) and the process shifts to step S507.

The tonguing time is measured by the tonguing time measurement timer 115 by executing the processes in step S504 to step S506 and step S509.

In step S507, the selection section 1096 selects either the first tonguing value decision information or the second tonguing value decision information depending on a magnitude relation between the level of the tonguing sensor signal which is normalized in step S503 and the selection threshold value Uc (step S507).

After execution of the process in step S507, the tonguing value acquisition unit 109 acquires the tonguing value which depends on the tonguing time that the current timer value indicates in accordance with the first or second tonguing value decision information which is selected in step S507 (step S508) and then terminates execution of the tonguing value acquisition process.

As described above, the electronic wind instrument 1 according to the third embodiment acquires the tonguing value which depends on the tonguing time which is measured by the tonguing time measurement timer 115 in accordance with the first or second tonguing value decision information which indicates the correspondence relation between the tonguing time and the tonguing value. In music playing using the electronic wind instrument 1 according to the third embodiment, it becomes possible to reproduce the musical performance expression which is given in a case where the legato tonguing is done by using the saxophone which is the natural woodwind instrument by the simple music playing operation with such a configuration.

Incidentally, in the third embodiment, description is made on the presumption that the tonguing value decision information storage unit 117 is configured to store two kinds of the tonguing value decision information, that is, the first tonguing value decision information and the second tonguing value decision information. However, the above configuration is merely one example and the tonguing value decision information storage unit 117 may be configured to store only one kind of the tonguing value decision information and the tonguing value acquisition unit 109 may be configured to acquire the tonguing value in accordance with this tonguing value decision information. It becomes possible to reduce a memory load on the ROM 8 with such a configuration.

Incidentally, the tonguing value decision information storage unit 117 may be also configured to store three or more kinds of the tonguing value decision information. In this case, the selection section 1096 may select any of the three or more kinds of the tonguing value decision information depending on the level of the tongue sensor signal which indicates the magnitude of the tongue sensor signal and is normalized by the normalization section 1093 and the tonguing value acquisition unit 109 may acquire the tonguing value in accordance with the tonguing value decision information which is selected by the selection section 1096. It becomes possible to acquire the tonguing value finely depending on the magnitude of the tongue sensor signal and thereby it becomes possible to improve accuracy of reproduction of the musical performance expression which is given by the saxophone by the electronic wind instrument 1 according to the third embodiment with such a configuration.

Incidentally, in the third embodiment, description is made on the presumption that the first tonguing value decision information is configured such that in a case where the tonguing time is longer than the second standard time Tb, the tonguing value is decided to 1 which is the maximum value and the second tonguing value decision information is configured such that in a case where the tonguing time is longer than the second standard time Tb, the tonguing value is decided to the first standard value Ub which is the maximum value. That is, in the third embodiment, description is made on the presumption that the tonguing time which corresponds to the maximum value (1) of the tonguing value in the first tonguing value decision information and the tonguing time which corresponds to the maximum value (the first standard value Ub) of the tonguing value in the second tonguing value decision information are the same as each other. However, this configuration is merely one example and the tonguing time which corresponds to the maximum value of the tonguing value in the first tonguing value decision information and the tonguing time which corresponds to the maximum value of the tonguing value in the second tonguing value decision information may be different from each other.

Although the embodiments of the present invention are described above, the embodiments are merely examples and the scope of application of the present invention is not limited to the above-mentioned embodiments. That is, the embodiments of the present invention are applicable in a variety of ways and all embodiments are included in the scope of the present invention.

For example, although in the first to third embodiments, description is made on the presumption that the electronic wind instrument 1 is configured to have the shape which resembles the shape of the saxophone, this configuration is merely one example and the electronic wind instrument 1 may be configured to have a shape which resembles the shape of any optional natural woodwind instrument. For example, the electronic wind instrument 1 may be configured to have a shape which resembles the shape of, a clarinet, a flute, an oboe or a trumpet.

Although in the first to third embodiments, description is made on the presumption that the electronic wind instrument 1 is configured to emit the musical sound which resembles the musical sound of the saxophone, this configuration is merely one example and it is possible to configure the electronic wind instrument 1 so as to emit a musical sound which resembles the musical sound of any optional natural woodwind instrument. For example, the electronic wind instrument 1 may be configured to emit a musical sound which resembles the musical sound of the clarinet, the flute, the oboe or the trumpet.

Although in the first to third embodiments, description is made on the presumption that the operation switch 6 is configured to include the power switch, this configuration is merely one example and it is possible to configure the operation switch 6 so as to include any optional switch which accepts an operation other than the music playing operation by the player. For example, the operation switch 6 may be configured to include a volume switch which accepts an operation of designating the volume of the music sound and to include a pitch switch which accepts an operation of designating the pitch of the musical sound.

Although in the first to third embodiments, description is made on the presumption that the breath sensor 44 is configured by the pressure sensor which detects the pressure of the player's breath, this configuration is merely one example and the breath sensor 44 may be any optional sensor which is capable of detecting the music playing operation that the player breathes into the mouthpiece 4.

For example, the breath sensor 44 may be a flow rate sensor which detects an amount of the player's breath which is guided into the cavity in the mouthpiece body 40 through the opening 40*a* in a case where the player breathes into the mouthpiece 4 in a state of holding the mouthpiece 4 in the mouth.

Although in the first to third embodiments, description is made on the presumption that the tongue sensor 45 is configured by the capacitance touch sensor, this configuration is merely one example and the tongue sensor 45 may be any optional sensor which is capable of detecting the music playing operation that the player brings the tongue into contact with the reed 41. For example, the tongue sensor 45 may be a resistive membrane system touch sensor, an infrared ray system touch sensor, a pressure sensor or a temperature sensor.

Although in the first to third embodiments, description is made on the presumption that the lip sensor 46 is configured by the capacitance touch sensor, this configuration is merely one example and the lip sensor 46 may be any optional sensor which is capable of detecting the music playing operation that the player brings the lips into contact with the mouthpiece 4. For example, the lip sensor 46 may be a resistive membrane system touch sensor, an infrared ray system touch sensor, a pressure sensor or a temperature sensor similarly to the tongue sensor 45.

Although in the first to third embodiments, description is made on the presumption that the silencing effect value decision unit 110 is configured to decide the silencing effect value depending on the lip position which is acquired by the lip position acquisition unit 107 and the tonguing value which is acquired by the tonguing value acquisition unit 109, this configuration is merely one example and the silencing effect value decision unit 110 may be also configured to decide the silencing effect value which depends on the tonguing value which is acquired by the tonguing value acquisition unit 109 without taking the lip position which is acquired by the lip position acquisition unit 107 into consideration. For example, the silencing effect value decision unit 110 may decide the tonguing value which is acquired by the tonguing value acquisition unit 109 as the silencing effect value. It becomes possible to reduce a processing load on the CPU 7 with such a configuration.

Although in the first to third embodiments, description is made on the presumption that the musical sound output unit 113 is configured to make the sound source unit 11 generate the digital musical sound signal which indicates the musical sound and to make the sound emission unit 5 emit the musical sound in accordance with the digital musical sound signal. However, this configuration is merely one example and it is possible for the musical sound output unit 113 to output the musical sound by any optional method. For example, the musical sound output unit 113 may make the sound source unit 11 generate the digital musical sound signal which indicates the musical sound, make the DAC/amplifier 50 generate the analog musical sound signal which corresponds to the digital musical sound signal and make the output interface 52 output the analog musical sound signal to an external headphone or an external loudspeaker.

Incidentally, some of or all the functional configurations of the electronic wind instruments 1 according to the first to third embodiments may be also configured to be realized by the sound source LSI that the sound source unit 11 includes.

Incidentally. it goes without saying that it is possible to provide an existing electronic wind instrument as the electronic wind instrument which includes in advance configurations for realizing the functions according to the present invention and it is also possible to make the existing electronic wind instrument function as the electronic wind instrument according to the present invention by application of a program. That is, it becomes possible to make the existing electronic wind instrument function as the electronic wind instrument according to the present invention by applying the program for realizing the respective functional configurations of the electronic wind instrument according to the present invention so as to make it possible for the CPU and so forth which control the operation of the existing wind instrument to execute the program.

Incidentally, such a program application method as mentioned above is optional. It is also possible to apply the program by storing the program into a computer-readable storage medium such as, for example, a flexible disc, a CD (Compact Disc)-ROM, a DVD (Digital Versatile Disc)-ROM, a memory card and so forth. Further, it is also possible to superimpose the program on carrier waves so as to apply the program via a communication medium such as the Internet and so forth. For example, the program may be distributed by posting the program on a BBS (Bulletin Board System) on a communication network. Then, the electronic wind instrument may be also configured to execute the above-mentioned processing and processes by activating the program and executing the program similarly to execution of other application programs under control of an OS (Operating System).

The invention claimed is:

1. An electronic wind instrument comprising:
a tongue sensor which detects tonguing;
a breath sensor which detects a breath value;
a loudspeaker which outputs a musical sound; and
at least one processor which controls the musical sound,
wherein the processor is configured to:
acquire a tonguing value which depends on a tonguing time which is a time which has elapsed after a start of the tonguing which is detected by the tongue sensor,
decide a silencing effect value which indicates a degree of volume reduction depending on the tonguing value,
acquire the breath value which depends on a magnitude of a breath sensor signal which indicates a result of detection by the breath sensor, and
make the loudspeaker emit the musical sound whose volume, which is set depending on the breath value, is reduced by an amount depending on the silencing effect value.

2. The electronic wind instrument according to claim 1, wherein the processor is configured to:
in a case where the tonguing time is longer than a first threshold time, acquire the first threshold time as the tonguing value,
in a case where the tonguing time is shorter than the first threshold time, acquire a value which is smaller than the first threshold time as the tonguing value, and
control so as to make the silencing effect value larger as the tonguing value becomes larger and to make the volume reduction degree higher as the silencing effect value becomes larger.

3. The electronic wind instrument according to claim 1, wherein the processor is configured to:
execute signal processing so that falling of a tongue sensor signal which is detected by the tongue sensor is not made gentle and so that rising of the tongue sensor signal is made gentle, and
acquire the tonguing value depending on a magnitude of the tongue sensor signal which is obtained after execution of the signal processing.

4. The electronic wind instrument according to claim 3, wherein the processor is configured to:
in the signal processing, decide whether the tongue sensor signal is a rise-time signal,
execute filtering for making the rising of the tongue sensor signal gentle in a case where it is decided that the tongue sensor signal is the rise-time signal, and
not execute the filtering on the tongue sensor signal in a case where it is decided that the tongue sensor signal is not the rise-time signal.

5. The electronic wind instrument according to claim 4, wherein the processor is configured to decide whether the tongue sensor signal is the rise-time signal depending on a magnitude relation between the magnitude of the tongue sensor signal and the tonguing value having been previously acquired.

6. The electronic wind instrument according to claim 4, wherein the filtering comprises IIR (Infinite Impulse Response) filtering or FIR (Finite Impulse Response) filtering.

7. The electronic wind instrument according to claim 1, further comprising:

a memory which stores therein tonguing multiplier information which indicates a correspondence relation between the tonguing time and a tonguing multiplier, wherein the processor is configured to:
measure the tonguing time,
decide the tonguing multiplier which depends on the measured tonguing time in accordance with the tonguing multiplier information, and
calculate the tonguing value by multiplying a magnitude of a tonguing signal which is detected by the tongue sensor by the tonguing multiplier which depends on the tonguing time.

8. The electronic wind instrument according to claim 1, further comprising:
a memory which stores therein tonguing value decision information which indicates a correspondence relation between the tonguing time and the tonguing value,
wherein the processor is configured to:
measure the tonguing time, and
acquire the tonguing value which depends on the measured tonguing time in accordance with the tonguing value decision information.

9. The electronic wind instrument according to claim 8, wherein:
the memory stores therein first tonguing value decision information and second tonguing value decision information, and
the processor is configured to:
select either the first tonguing value decision information or the second tonguing value decision information depending on a magnitude of a tongue sensor signal which indicates a result of detection by the tongue sensor,
acquire the tonguing value which depends on the tonguing time in accordance with the selected tonguing value decision information,
in a case where the first tonguing value decision information is selected and the tonguing time is at least a reference amount of time, acquire a first reference value as the tonguing value, and
in a case where the second tonguing value decision information is selected and the tonguing time is at least the reference amount of time, acquire a second reference value which is smaller than the first reference value as the tonguing value.

10. An electronic wind instrument controlling method comprising:
acquiring a tonguing value which depends on a tonguing time which is a time which has elapsed after a start of tonguing;
deciding a silencing effect value which indicates a degree of volume reduction depending on the tonguing value,
acquiring a breath value which depends on a magnitude of a breath sensor signal which indicates a result of detection by a breath sensor; and
outputting a musical sound which has a volume which is acquired by reducing a volume, which is set depending on the breath value, by an amount depending on the silencing effect value.

11. A non-transitory computer-readable storage medium storing a program executable by a computer which controls an electronic wind instrument to execute processes comprising:
acquiring a tonguing value which depends on a tonguing time which is a time which has elapsed after a start of tonguing;
deciding a silencing effect value which indicates a degree of volume reduction depending on the tonguing value,
acquiring a breath value which depends on a magnitude of a breath sensor signal which indicates a result of detection by a breath sensor; and
outputting a musical sound which has a volume which is acquired by reducing a volume, which depends is set depending on the breath value, by an amount depending on the silencing effect value.

* * * * *

UNITED STATES PATENT AND TRADEMARK OFFICE
CERTIFICATE OF CORRECTION

| | |
|---|---|
| PATENT NO. | : 11,749,239 B2 |
| APPLICATION NO. | : 17/004226 |
| DATED | : September 5, 2023 |
| INVENTOR(S) | : Yuji Tabata |

It is certified that error appears in the above-identified patent and that said Letters Patent is hereby corrected as shown below:

In the Claims

Column 42, Line 35, after "which" delete "depends".

Signed and Sealed this
Seventeenth Day of October, 2023

Katherine Kelly Vidal
*Director of the United States Patent and Trademark Office*